(12) United States Patent
Takahashi et al.

(10) Patent No.: US 7,247,345 B2
(45) Date of Patent: Jul. 24, 2007

(54) OPTICAL FILM THICKNESS CONTROLLING METHOD AND APPARATUS, DIELECTRIC MULTILAYER FILM AND MANUFACTURING APPARATUS THEREOF

(75) Inventors: Haruo Takahashi, Kanagawa-ken (JP); Kouichi Hanzawa, Kanagawa-ken (JP); Takafumi Matsumoto, Kanagawa-ken (JP)

(73) Assignee: ULVAC, Inc., Kanagawa (JP)

( * ) Notice: Subject to any disclaimer, the term of this patent is extended or adjusted under 35 U.S.C. 154(b) by 756 days.

(21) Appl. No.: 10/394,667

(22) Filed: Mar. 24, 2003

(65) Prior Publication Data

US 2004/0008435 A1    Jan. 15, 2004

(30) Foreign Application Priority Data

Mar. 25, 2002    (JP)    ............................. 2002-083260
Oct. 31, 2002    (JP)    ............................. 2002-317998
Oct. 31, 2002    (JP)    ............................. 2002-317999

(51) Int. Cl.
    *B05D 5/06*    (2006.01)
(52) U.S. Cl. ................... 427/162; 427/8; 427/9
(58) Field of Classification Search ........... 427/8, 427/9, 162
    See application file for complete search history.

(56) References Cited

U.S. PATENT DOCUMENTS

| 4,335,961 | A  | * | 6/1982  | Chou et al. ................. 356/517 |
| 4,885,709 | A  | * | 12/1989 | Edgar et al. ................. 702/30 |
| 6,768,967 | B2 | * | 7/2004  | Johnson et al. ............. 702/179 |
| 6,838,160 | B2 | * | 1/2005  | Sasaki et al. ............... 428/220 |
| 2003/0049376 | A1 | * | 3/2003 | Schwarm et al. ....... 427/255.28 |
| 2003/0218754 | A1 | * | 11/2003 | Umeda ...................... 356/485 |

FOREIGN PATENT DOCUMENTS

| JP | 58-140605 | 8/1983 |
| JP | 61-183464 | 8/1986 |
| JP | 63-28862  | 2/1988 |
| JP | 4-173972  | 6/1992 |
| JP | 10-317135 | 12/1998 |

* cited by examiner

*Primary Examiner*—Alain L. Bashore
(74) *Attorney, Agent, or Firm*—Arent Fox, LLP.

(57) ABSTRACT

A method of controlling film thickness of dielectric multilayer film with high precision, an optical film thickness controlling apparatus and a dielectric multilayer film manufacturing apparatus that can control the film thickness. An optical film thickness controlling apparatus includes a film formation device having a rotatable substrate and a sputtering target, a photodiode that detects each of a plurality of monochromatic light beams applied to the rotatable substrate along a radius thereof at predetermined intervals, in which a movable shutter that moves along the direction of the radius of the rotatable substrate to shut off film formation on the substrate between the substrate and the target. From each of the monochromatic light beams, a quadratic regression function of reciprocal transmittance is calculated by a least squares method, and a CPU and a motor driver move the movable shutter to shut off the film formation at the film formation region.

3 Claims, 12 Drawing Sheets

OPTICAL FILM THICKNESS CONTROLLING METHOD AND APPARATUS, DIELECTRIC MULTILAYER FILM AND MANUFACTURING APPARATUS THEREOF

BACKGROUND OF THE INVENTION

1. Field of the Invention

The present invention relates to a method of controlling film thickness of optical thin film when forming the film, in particular, that on the basis of optical technique, an apparatus of controlling film thickness for carrying out the method, and an apparatus of manufacturing dielectric multilayer film that is mainly used as optical thin film and can be controlled in thickness with high precision during the formation thereby. Optical thin films have been used in wider variety of optical components or elements, such as waveguide, diffraction grating, light emitter, indicator, optical memory and solar cell. In particular, as for optical thin films used for dense wavelength division multiplexing devices in communications technology field, which involves optical communications, the tendency to be made with multilayers is remarkable. Accordingly, it has become essential to control with high precision the optical film thicknesses of each layer in the multilayer structure of optical thin film.

2. Description of the Related Art

Measuring film thickness of thin film during the growth thereof is essential to control the deposition rate and the film thickness. As for optical thin films, the optical film thickness (product of the refractive index and the physical film thickness), which determines an optical property, such as reflectance and transmittance, is more useful than the physical film thickness. Therefore, widely conducted is monitoring the optical film thickness by measuring an optical property of thin film during the growth thereof according to a so-called optical film thickness controlling method, which is to measure an optical property of thin film. The optical film thickness controlling method includes a monochromatic photometry, a dichromatic photometry and a polychromatic photometry. Of these optical film thickness controlling methods, the simplest is the monochromatic photometry.

The monochromatic photometry involves making use of a peak (and also a bottom, each being equivalent to a maximum and a minimum, respectively, hereinafter) that appears when the optical film thickness of the thin film being formed reaches to an integral multiple of the $\lambda/4$ ($\lambda$: a wavelength of incident monochromatic light). Such a peak does not always appear when the optical film thickness of the film being formed reaches to an integral multiple of the $\lambda/4$ for the first time after the start of the growth, if the optical film thickness of the substrate-sided adjacent layer on which the latest surface layer film being formed is stacked on the coated surface thereof is not equal to an integral multiple of the $\lambda/4$, or if the admittance of the system including the adjacent layer cannot be shown with a mathematical real number. However, in such cases, once the peak has appeared, it periodically appears in the growth cycle of the optical film thickness coinciding to an integral multiple of the $\lambda/4$.

However, in the monochromatic photometry, the aforesaid conventional methods involving the peak control using the appearing peak cannot avoid degraded control precision to some extent in principle, because the intensity of light varies little with respect to the increasing optical film thickness in the vicinity of the peak.

The precision can be improved by using an interference filter designed for a wavelength slightly different from a desired one to be used for the control to terminate the film formation at a point, other than the vicinity of the peaks, where the intensity of light varies significantly. As an approach of this kind, the intensity of light (reciprocal transmittance), which is an optical property, may be measured to select an optical phase angle area that provides a high control precision of the growth optical film thickness, thereby determining a terminating time point for film formation (for example, see the Patent Reference 1).

On the other hand, in the art of the Patent Reference 2, for example, pursues use of a conventional monochromatic photometry using a desired wavelength. According to this approach, measured data group obtained right before the intensity of light measured (transmittance) forms a peak in response to the growth of an integral multiple of the $\lambda/4$ of optical film thickness is regressed to a quadratic function by way of the least squares method. And a time point at which a peak on the regressed function may be formed is predicted to determine a timing of terminating the film formation, accordingly. Most preferably, the timing is the predicted point itself, but if specific conditions are to be considered, the timing is determined referring to the predicted point as the time point basis.

Patent Reference 1: Japanese Patent Laid-Open No. S58-140605 (p. 2 to 3, FIG. 1)

Patent Reference 2: Japanese Patent Laid-Open No. S63-28862 (p. 2 to 6, FIGS. 1 and 2)

SUMMARY OF THE INVENTION

The demand to form optical thin film with more layers is remarkable in the communications field as described above. In particular, multilayer optical thin film in a dense wavelength division multiplexing device (band pass filter, for example) possibly comprises 100 or more layers. The multilayer structure is formed with alternate layers comprising of high-refractive-index layer and low-refractive-index layer each having optical film thickness equal to an odd multiple of the $\lambda/4$ (in the case of the band pass filter, a cavity layer may be formed by a high-refractive-index layer or a low-refractive-index layer having optical film thickness equal to an even multiple of the $\lambda/4$ between the alternate layers). In this case, an ordinary method involving controlling the film thickness of each thin film in the multilayer structure by replacing a monitor substrate associated therewith is not practical because the required process becomes complicated.

Thus, a multilayer structure comprising many alternate layers similar to the product thin film may be stacked on a monitor substrate and the multilayer structure may be monitored, accordingly. However, in this case, as the number of layers are stacked, the reflectance of the growing multilayer structure increases, that is, the transmittance thereof gradually decreases and thus the reliability of measured value is reduced. Therefore, if the function regression described above is performed, the measured values of the transmittance are plotted off the function curve in the vicinity of a peak in the quadratic regression function, in particular, and thus, its correlation becomes lower. Therefore, the film thickness is difficult to control with high precision. In addition, in terms of precision, there is a question whether or not all the constituent thin films in the multilayer structure to be monitored on the monitor substrate can be an exact reproduction of the layers of the product thin film.

Therefore, as for the optical thin film made with multilayers, the film thickness is often controlled by a direct monitoring method, in which the many alternate layers themselves stacked on a product substrate are monitored. FIG. 1 shows an example of a film thickness controlling apparatus for the direct monitoring method. As shown in FIG. 1(a), an electron gun 2 and an ion gun 3 are disposed alongside to face a rotatable substrate 4 in a vacuum chamber 1, a light emitter 5 is disposed opposite to the rotatable substrate 4 outside the chamber 1, the light emitted by the light emitter 5 along a rotation axis 4a of the rotatable substrate 4 passes through a lower light introducing window 6 and an upper light introducing window 7 and is received by a light receiver 8 located outside of the chamber 1. In the film thickness control according to the apparatus, the product substrate 4 is rotated by a driving motor 9, and then, one monitoring monochromatic light flux from the light emitter 5 is passed through the lower light introducing window 6 along the rotation axis 4a. In this state, a shutter 2a is opened to form deposited film on the product substrate 4 by means of the electron gun 2. At this time, the light receiver 8 detects a variation of intensity of light due to interference through the lower light introducing window 6 and the upper light introducing window 7. Then, the film thickness of the deposited film being formed is controlled based on the variation of intensity of light. That is, a terminating time point for film formation is determined according to the film thickness controlling method described in the Patent References 1 or 2, for example. Then, the film formation using the electron gun 2 is shut off by the shutter 2a to terminate the growth of the film thickness. In this way, dielectric multilayer film having satisfactory spectral property is produced in the vicinity of the center of the product substrate.

However, also in this case, as the number of layers are stacked, the reflectance of the growing multilayer structure increases, that is, the transmittance thereof gradually decreases and the reliability of measurements is reduced, which causes the same disadvantages like the case of the monitor substrate. This influence is serious, in particular, in a narrow-band pass filter made with a stack of a large number of alternate layers comprising of high-refractive-index films of the λ/4 and low-refractive-index films of the λ/4. Furthermore, as the number of the alternate layers is stacked, a curve indicating a variation of intensity of transmitted light that varies in accordance with increase of the film thickness is plotted off the quadratic regression function even in the vicinities of the peak and bottom, and the film thickness becomes difficult to control with high precision. FIG. 2 shows such a disjunction from the quadratic regression function. The peak and bottom positions predicted by the quadratic function regression become significantly different when the intensity of transmitted light decreases (i.e. a high-refractive-index layer H on a low-refractive-index layer L is the latest surface layer) and when the intensity of transmitted light increases (i.e. a high-refractive-index layer H on a high-refractive-index layer H is the latest surface layer), resulting in dispersing errors significantly. Therefore, there are problems in that a predicted terminating time point for film formation is too early when the intensity of transmitted light decreases, and a predicted terminating time point for film formation is too late when the intensity of transmitted light increases.

In view of such problems, an object of the present invention is to provide a method of controlling film thickness of dielectric multilayer film, such as optical thin film, with high precision, an optical thin thickness controlling apparatus and a dielectric multilayer that can control the film thickness based on the same method, and dielectric multilayer film manufactured using the controlling apparatus or the manufacturing apparatus.

In order to attain the object, according to the invention, over a period of formation of single-layer or multilayer optical thin film, incident monochromatic light (wavelength λ) is transmitted through the single-layer or multilayer structure, the transmittance of the optical thin film is measured, and the reciprocal of the transmittance is defined calculatedly as a reciprocal transmittance.

Here, from a boundary condition of the structure (that is, each tangential component of B or C of the electric field or magnetic field, respectively, are continuous), the admittance C/B of the system is expressed, using a characteristic matrix of the single layer film, by the following formula (1).

[Formula 1] (1)

$$\begin{bmatrix} B \\ C \end{bmatrix} = \begin{bmatrix} \cos\theta & \dfrac{i}{N\sin\theta} \\ iN\sin\theta & \cos\theta \end{bmatrix} \begin{bmatrix} 1 \\ Y \end{bmatrix}$$

In this formula, N indicates a refractive index of the single-layer film, θ indicates a phase difference between different interfaces on the single-layer film, and Y indicates the admittance of the substrate system.

The transmittance T of the single-layer film is expressed by the following formula (2), where symbol * indicates complex conjugate.

$$T = 4Y/(B+C)(B+C)^* \qquad (2)$$

Therefore, the following formula (3) is derived from the formulas (1) and (2).

$$T = 4Y/[(1+Y)^2 + \{(Y/N+N)^2 - (1+Y)^2\}\sin^2\theta] \qquad (3)$$

Here, it is assumed that the refractive index of air or vacuum is 1.

Furthermore, in the invention, an optical phase angle θ is expressed by the following formula (4) involving a wavelength λ of the monochromatic light and optical film thickness Nd of the latest growing surface layer film being deposited (N indicates refractive index of the thin film, and d indicates physical thickness of the thin film).

$$\theta = 2\pi Nd/\lambda \qquad (4)$$

Furthermore, with a least squares method, measured data group of two variables, that is, the film growing time (t) of the surface layer film associated with increase of the optical film thickness and the reciprocal transmittance (1/T), are regressed to a quadratic function before the measured data group achieves a maximum or minimum so that the quadratic regression function of the following formula (5) would be provided, where $A_0$ and $B_0$ are constant, $t_p$ indicates a film growing time when a maximum or minimum is achieved).

$$1/T = A_0 + B_0(t - t_p)^2 \qquad (5)$$

For a higher correlation of the regression function, it is desired that the function regression is performed on measured data group sampled on and after a time point when the optical film thickness of the surface layer film approaching a maximum or minimum of the function curve reaches to the last about 25 to 10% of the film thickness equal to the λ/4 for the maximum or minimum (λ: wavelength of the monochromatic light).

While the formula (3) is transformed into the following formula (6), $$1/T = (1+Y)^2/4Y + \{(Y/N+N)^2 - (1+Y)^2\} \sin^2 \theta / 4Y \quad (6)$$

the transmittance $T_0$ of the latest surface layer film at the time point when the growth of the latest surface layer film is started, and the transmittance $T_{90}$ of the latest surface layer at the time point when the optical film thickness thereof reaches to the $\lambda/4$ are expressed by the following formulas (7) and (8), respectively.

$$T_0 = 4Y/(1+Y)^2 \quad (7)$$

$$T_{90} = 4Y/(Y/N+N)^2 \quad (8)$$

If the admittance Y is real number, the following formula (9) is derived from these formulas.

$$(1/T_0 - 1/T)/(1/T_0 - 1/T_{90}) = \sin^2 \theta \quad (9)$$

Thus, the reciprocal transmittance can be expressed as a function depending only on optical phase angle.

Based on the interference theory described above, the reciprocal transmittance has periodical distribution at every interval of optical film thickness coinciding to ¼ of wavelength of the monochromatic light. In the vicinity of a maximum and minimum of the reciprocal transmittance, the function of reciprocal transmittance derived by development of the formula (9) ($\theta$ works as the variable and $\sin^2 \theta$ is also involved in the function) can be approximated to a quadratic function. Therefore, as predicted value of the film growing time when optical film thickness at the maximum or minimum is achieved, the film growing time at the maximum or minimum on the quadratic regression function can be used. By terminating the film formation of the surface layer film at the predicted time, the optical film thickness can be controlled to coincide to ¼ of wavelength of the monochromatic light.

Such optical film thickness controlling method is simple because an optical property of the entire multilayer structure the same as that of the thin film product can be measured at a time and peak control is performed accordingly. In addition, since peak prediction is performed based on quadratic function regression of a high correlation, the film thickness can be controlled with high precision.

In this case, the optical film thickness of the surface layer film can be calculated based on the function of reciprocal transmittance derived by development of the formula (9) as described above. Therefore, the optical film thickness can be controlled to be desired value by predicting the growing time of the surface layer film when reaching to target value of the optical film thickness thereof with the deposition rate of the latest surface layer film, which can be defined calculatedly with its time differential and its time difference. That is, the optical film thickness to be controlled is not limited to the one coinciding to ¼ of wavelength of the monochromatic light, but any optical film thickness can be predicted.

Furthermore, since the transmittance accompanied with formation of the optical thin film is measured on the product substrate, in-situ measurement of the product thin film, that is, direct monitoring method of the optical film thickness of the latest surface layer film can be carried out. Thus, the optical film thickness controlling method is further improved in handling and precision thereof.

In order to carry out the above-described optical film thickness controlling method, there is provided an optical film thickness controlling apparatus comprising a film formation device having a rotatable substrate and a film material source facing each other, and a photoelectric conversion device that detects a plurality of monochromatic light beams applied to the rotatable substrate at predetermined intervals along a radius thereof, a movable shutter that moves in the direction of the radius of the rotatable substrate to shut off the film formation on the substrate is provided between the substrate and the film material source thereof. The optical film thickness controlling apparatus is designed so that the movable shutter is moved in response to a controller indicating motion of the shutter based on each of predicted values of film growing time predicted with the monochromatic light beams detected by the photoelectric conversion device. Thus, the film growing time of the surface layer film when reaching to intended optical film thickness can be predicted according to the optical film thickness controlling method described above. On the surface layer film, the film formation process is terminated within a region where the film has grown to the intended film optical film thickness, and such termination of the film formation process is successively performed. In this way, the film thickness can be controlled with high precision to provide uniform distribution of film thickness.

Furthermore, in the current optical communications market, narrow-band pass filters used in multiplexer/demultiplexers for a DWDM system require a set of band pass filters designed for various kinds, for example, 4, 8, 16, . . . , 128 of center wavelength determined by the ITU-T (International Telecommunication Union-Telecommunication Standardization Sector). Thus, there is a need to manufacture filters centered at various wavelengths simultaneously and in large quantity.

However, in the multilayer film manufacturing apparatus shown in FIG. 1, the monitoring monochromatic light flux passes through only along the rotation center axis. Therefore, the direct monitoring method is effective only within the central region denoted by reference numeral 10 in FIG. 1(*b*). An optical thin film product provided from within the substrate region, denoted by reference numeral 11, apart from the center of the substrate has variations of wavelength property and the like due to fluctuations of evaporation distribution, difference in relative distance between the product substrate and the evaporation source, non-uniform temperature of the product substrate surface and the like, and thus, does not exhibit a satisfactory property for the monitoring wavelength used in the direct monitoring method.

Thus, the position of the applied monitoring monochromatic light flux passing through the substrate may be shifted from the rotation center axis to a point on a circumference of a concentric circle within the rotating substrate region, and the region formed in an annular band shape along the circumference may be used as an effective region for the direct monitoring method. However, in this case, only little improvement in the effective region area can be obtained. At the region where the monitoring monochromatic light flux for the direct monitoring method passes through the substrate, even when the film thickness of the layer formed right before the latest surface layer is controlled with lower precision, if the terminating time point for film formation of the following latest surface layer can be controlled exactly at a peak and bottom, the errors are naturally corrected, the errors are reduced accordingly. Thus, in order to obtain a high-quality optical thin film product, since significant advantage can be brought to the monitoring region, it is essential that the region is enlarged.

Thus, the vacuum chamber of one of dielectric multilayer film manufacturing apparatus according to the invention has a film material source and a reaction source, each arranged alongside to face a rotatable substrate, and the one of dielectric multilayer film manufacturing apparatus comprises: a film deposition rate controlling member having an opening that gives a gradient along a radius of the rotating substrate circle to a film deposition rate of the dielectric multilayer film formed on said rotatable substrate; a film thickness correcting member that corrects the film thickness of the dielectric multilayer film formed on said rotatable substrate, the film deposition rate controlling member and the film thickness correcting member being provided between said rotatable substrate and said film material source; light intensity measuring means that measures the intensity of monitoring monochromatic light passing through a plurality of monitoring points along the radius of said rotatable substrate; and a control system that arranges monitoring monochromatic light fluxes of at least two wavelengths in ascending or descending order of the wavelengths of the monochromatic light fluxes associated with the positions of the monitoring points along said radius to make the light fluxes pass through the respective monitoring points, and can move said film thickness correcting member in response to a variation of the light intensity measured by said light intensity measuring means.

In this apparatus, the monochromatic light fluxes are arranged in ascending or descending order of the wavelengths thereof associated with the positions of the monitoring points along the radius, so that the monitoring monochromatic light fluxes of different wavelengths pass through the respective monitoring points.

Here, the values of nd/λ, λ of which is a monitoring wavelength the monitoring monochromatic light fluxes passing through the monitoring points on the rotatable substrate are arranged in ascending order, as the monitoring points are arranged along the radius thereof from the outer perimeter to the inner perimeter of the substrate. In a state where the monitoring monochromatic light fluxes are arranged in such a manner, when the light intensity, depending on increase of the film thickness of the latest surface layer of the dielectric multilayer film, is detected by the light intensity measuring means, the gradient of the film deposition rate caused by the opening of the film deposition rate controlling member has decrease along the radius of the rotating substrate circle from the outer perimeter to the inner perimeter thereof, and the peak is formed earlier at a monitoring point of the outer perimeter of the rotating substrate circle to which a shorter monitoring wavelength is assigned. Thus, the increase of the film thickness of the dielectric multilayer film can be corrected by moving actuating the film thickness correcting member from the outer perimeter to the inner perimeter of the rotating substrate circle in response thereto. That is, the film thickness of the latest surface layer film of the dielectric multilayer film can be controlled with high precision. Furthermore, since the monochromatic light of at least one wavelength is used as monitoring light flux, the dielectric multilayer film can be manufactured by controlling the film thickness with a direct monitoring method for various monitoring wavelengths.

The direction of motion of the film thickness correcting member described above is not necessarily limited to the direction from the outer perimeter to the inner perimeter of the rotating substrate circle. The values of nd/λ, λ of which is a monitoring wavelength the monitoring monochromatic light fluxes passing through the monitoring points on the rotatable substrate are arranged so that λ varies from longer wavelength to shorter one, namely in descending order, as the monitoring points are arranged along the radius thereof from the outer perimeter to the inner perimeter of the substrate. In this case, when the light intensity, depending on the film thickness of the latest surface layer of the dielectric multilayer film, is detected by the light intensity measuring means, the gradient of the film deposition rate caused by the opening of the film deposition rate controlling member has increase along the radius of the rotating substrate circle from the outer perimeter to the inner perimeter thereof, and the peak is formed earlier at a monitoring point of the inner perimeter of the rotating substrate circle to which a shorter monitoring wavelength is assigned. Thus, the non-uniformity of the film thickness of the dielectric multilayer film can be corrected by moving actuating the film thickness correcting member from the inner perimeter to the outer perimeter of the rotating substrate circle in response thereto.

A shutter movable in the direction of the radius of said rotatable substrate is used as the film thickness correcting member, and film formation on the rotatable substrate is shut off in the above-described ascending or descending order along the radius by motion of the movable shutter.

Accordingly, in order to obtain the dielectric multilayer film of the same quality formed in the shape of an annular band for each of the monochromatic light of different wavelengths passing through the monitoring points, the film formation can be shut off under the same condition. Therefore, various high-quality dielectric multilayer films, which are obtained from the annular-band-shaped monitoring regions, can be produced on a large scale.

Furthermore, by means of a control system of the dielectric multilayer film manufacturing apparatus, the variation of the light intensity, which is measured by the light intensity measuring means, is first measured as the variation of the transmittance when the monitoring monochromatic light flux comprising at least one wavelength is made to pass through each of a plurality of monitoring points over a period of formation of dielectric multilayer film on the rotatable substrate, and the reciprocal of the transmittance is defined calculatedly as a reciprocal transmittance.

Based on the interference theory described above, the reciprocal transmittance is periodically distributed at intervals of optical film thickness coinciding to ¼ of wavelength of the monochromatic light, and in the vicinity of a maximum and minimum of the reciprocal transmittance, the function of reciprocal transmittance derived by development of the formula (9) (the function depending on a variable θ in a term of $\sin^2 \theta$) can be approximated to a quadratic function. Therefore, as a predicted time for the latest surface layer film to reach to the optical film thickness at the maximum or minimum, the film growing time at the maximum or minimum on the quadratic regression function can be used. The film formation of the surface layer film is terminated at the predicted time. In this process, since peak control is performed based on quadratic function regression with a high correlation, the control precision for reaching to the optical film thickness coinciding to ¼ of wavelength of the monochromatic light is further improved.

In this case, the optical film thickness of the surface layer film can be calculated based on the function of reciprocal transmittance derived by development of the formula (9) as described above. Therefore, the time differential or time difference can be calculated as the film deposition rate of the latest surface layer film, and the time when the latest surface layer film reaches to a predetermined optical film thickness can be predicted based on the film deposition rate. Thus, the desired optical film thickness can be predicted and controlled. That is, the optical film thickness to be controlled is not limited to one coinciding to ¼ of wavelength of the monochromatic light, and any optical film thickness can be controlled.

Furthermore, as an alternative to the manufacturing apparatus described above, another dielectric multilayer film manufacturing apparatus according to the invention has a vacuum chamber used for the manufacture having a film material source and a reaction source, each arranged alongside to face a rotatable substrate, and comprises: a film deposition rate controlling member having an opening for controlling a film deposition rate of the dielectric multilayer film formed on said rotatable substrate; a film thickness correcting member having an opening for correcting the film thickness of the dielectric multilayer film formed on said rotatable substrate, the film deposition rate controlling member and the film thickness correcting member being provided between said rotatable substrate and said film material source; light intensity measuring means that measures the intensity of monitoring monochromatic light passing through a plurality of monitoring points along the radius of said rotatable substrate; and a control system that actuates partially independently the opening of said film thickness correcting member in response to a variation of the light intensity measured by said light intensity measuring means when each of the monitoring monochromatic light fluxes of one or more wavelengths passes through said monitoring point.

With this apparatus, the light intensity, depending on increase of the film thickness of the latest surface layer of the dielectric multilayer film formed on the substrate, is detected by the light intensity measuring means, and the opening of the film thickness correcting member opens or closes in response to the light intensity, whereby the increase of the film thickness of the dielectric multilayer film can be corrected. That is, the film thickness of the latest surface layer film of the dielectric multilayer film can be controlled with high precision. Furthermore, in this process, since the monochromatic light of at least one wavelength is used as monitoring light flux, the dielectric multilayer film can be manufactured by controlling the film thickness with a direct monitoring method for various monitoring wavelengths.

As the control system for partially and independently opening or closing the film thickness correcting member, split shutters are used which opens or closes independently the arc-shaped regions formed along circumferences of concentric circles which are drawn by the trace of each of monitoring points when the rotatable substrate rotates.

Accordingly, in order to obtain the dielectric multilayer film of the same quality formed in each arc shape for every monochromatic light flux among different wavelengths passing through the monitoring points, the film formation can be shut off under the same condition. Therefore, various high-quality dielectric multilayer films, which are obtained from the arc-shaped monitoring regions, can be produced on a large scale.

Furthermore, by means of a control system of the dielectric multilayer film manufacturing apparatus, the variation of the light intensity, which is measured by the light intensity measuring means, is first measured as the variation of the transmittance when the monitoring monochromatic light flux comprising at least one wavelength is made to pass through each of a plurality of monitoring points over a period of formation of dielectric multilayer film on the rotatable substrate, and the reciprocal of the transmittance is defined calculatedly as a reciprocal transmittance.

Based on the interference theory described above, the reciprocal transmittance is periodically distributed at intervals of optical film thickness coinciding to ¼ of wavelength of the monochromatic light, and in the vicinity of a maximum and minimum of the reciprocal transmittance, the function of reciprocal transmittance derived by development of the formula (9) (the function depending on a variable θ in a term of $\sin^2 θ$) can be approximated to a quadratic function. Therefore, as a predicted time for the latest surface layer film to reach to the optical film thickness at the maximum or minimum, the film growing time at the maximum or minimum on the quadratic regression function can be used. The film formation of the surface layer film is terminated at the predicted time. In this process, since peak control is performed based on quadratic function regression with a high correlation, the control precision for reaching to optical film thickness coinciding to ¼ of wavelength of the monochromatic light is further improved.

In this case, the optical film thickness of the surface layer film can be calculated based on the function of reciprocal transmittance derived by development of the formula (9) as described above. Therefore, the film thickness can be controlled to be desired optical film thickness by detecting predetermined optical film thickness reached to by the latest surface layer film. That is, the optical film thickness to be controlled is not limited to one coinciding to ¼ of wavelength of the monochromatic light, and any optical film thickness can be controlled.

In both the dielectric multilayer film manufacturing apparatus, sputtering targets of at least two different materials provided in such a manner that any of the targets can be selected are used as the film formation source. Thus, a desired target material can be selected as a material for each of the constituent layers in the dielectric multilayer film, and therefore, the multilayer film manufacture is improved conveniently.

When Ta metal and Si metal are used as the different materials of the sputtering targets, tantalum compound film, such as $Ta_2O_5$ film, which is a common high-refractive-index layer of optical thin film products including BPF, and silicon compound film, such as $SiO_2$ film, which is a common low-refractive-index layer of the optical thin film products, can be manufactured.

When the reaction source emits reactive neutral radical gas, the increase of the temperature of the substrate is suppressed when the compound film as described above is formed on the surface layer film. As a result, degradation of the precision of controlling the optical film thickness is suppressed.

Furthermore, dielectric multilayer film manufactured using the optical film thickness controlling apparatus or dielectric multilayer film manufacturing apparatuses described above can have precisely controlled optical film thickness, and thus, it is suitable for optical thin film applications.

DETAILED DESCRIPTION OF THE PREFERRED EMBODIMENTS

Figure 1A:
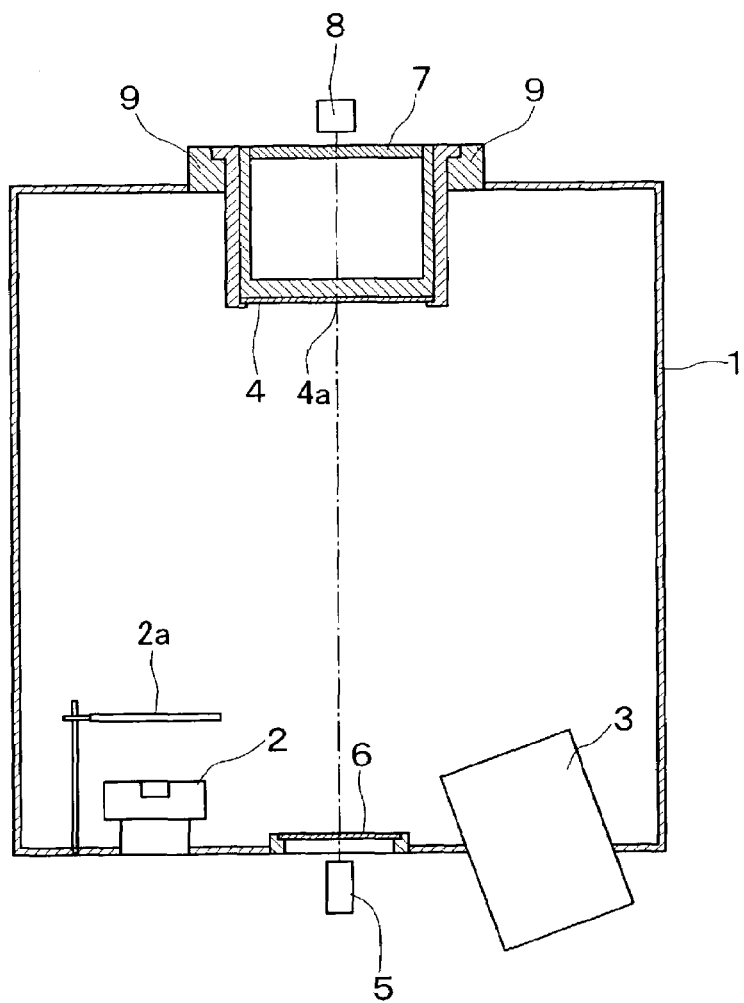
FIG. 1(a) is a schematic cross-sectional view of a conventional dielectric multilayer film manufacturing apparatus intended for a direct monitoring method.
Figure 1B:
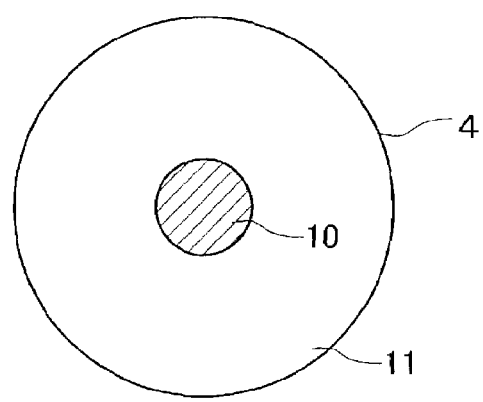
FIG. 1(b) is a conceptual diagram showing an optical property region on a substrate used in the manufacturing apparatus shown in FIG. 1(a)
Figure 2:
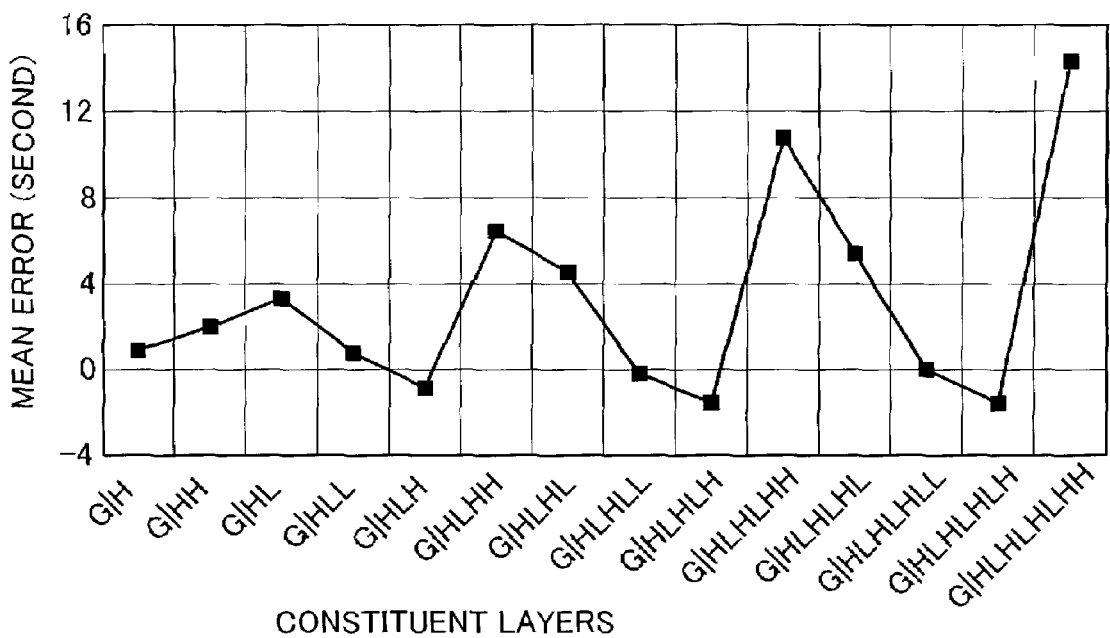
FIG. 2 is a graph showing a deviation from a quadratic regression function according to a conventional optical film thickness controlling method.
Figure 3:
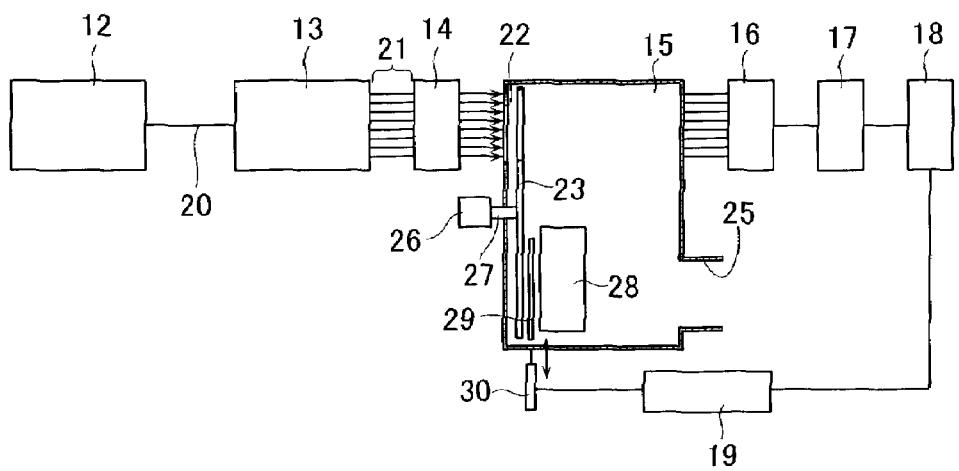
FIG. 3 schematically shows an optical film thickness controlling apparatus according to the invention.

FIG. 3 schematically shows an optical film thickness controlling apparatus that carries out an optical film thickness controlling method according to the invention. The optical film thickness controlling apparatus comprises a tunable laser light source 12, an 8-branch optical coupler 13, an 8-throw fiber collimator 14, a sputtering film formation device 15, an 8-throw photodiode 16 made of InGaAs, an 8-channel A/D converter 17, a CPU 18 for data processing and a linear motor driver 19.

The tunable laser light source 12 is connected to the optical coupler 13 via a single mode optical fiber cable 20, and the optical coupler 13 is connected to the fiber collimator 14 via a single mode optical fiber cable 21. Light from the laser source 12 is separated into eight light beams by the optical coupler 13. Then, the eight light beams are made parallel to each other by the fiber collimator 14 and then, passes through a transparent window 22 and a rotatable substrate 23 of the sputtering film formation device 15 to the photodiode 16. The CPU 18 for data processing and the linear motor driver 19 are connected to each other via an output/input interface 31, such as RS232C.

The sputtering device 15 has an evacuation vent 25 coupled to a vacuum pump (not shown in the drawing). In the sputtering device, the rotatable substrate 23 supported by a rotary shaft 27 driven by a rotary drive mechanism 26 and a target 28 mounted on a sputtering cathode (not shown in the drawing) are disposed so as to face each other. A movable shutter 29, which can move in the direction of the radius of the substrate 23, is provided between the rotatable substrate 23 and the target 28. This shutter 29 interposed between the substrate 23 and the target 28 enables the film formation on the substrate 23 to be shut off. Motion of the movable shutter 29 is externally controlled by a linear motor 30 in response to an indication from the linear motor driver 19.

In performing the film thickness control according to the invention by using the film thickness controlling apparatus, the vacuum pump (not shown in the drawing) coupled to the evacuation vent 25 is first activated to enable the sputtering film formation device 15 to be activated. Then, the tunable laser light source 12 is activated to irradiate the rotatable substrate 23 with the eight parallel light beams described above. In this state, the sputtering film formation by the device 15 is started. Here, this time point is defined as a start point of the film formation time of the thin film.

Each of the eight parallel light beams having passed through the substrate 23 is converted into a voltage signal by the photodiode 16. The voltage signal is converted into a digital numeric signal by the A/D converter 17. The digital numeric signal is inputted to the CPU 18 for data processing, where the signal is regressed to a quadratic function having a domain which is equivalent to 70 to 90% of the film formation time based on the formula (5).

Figure 4:
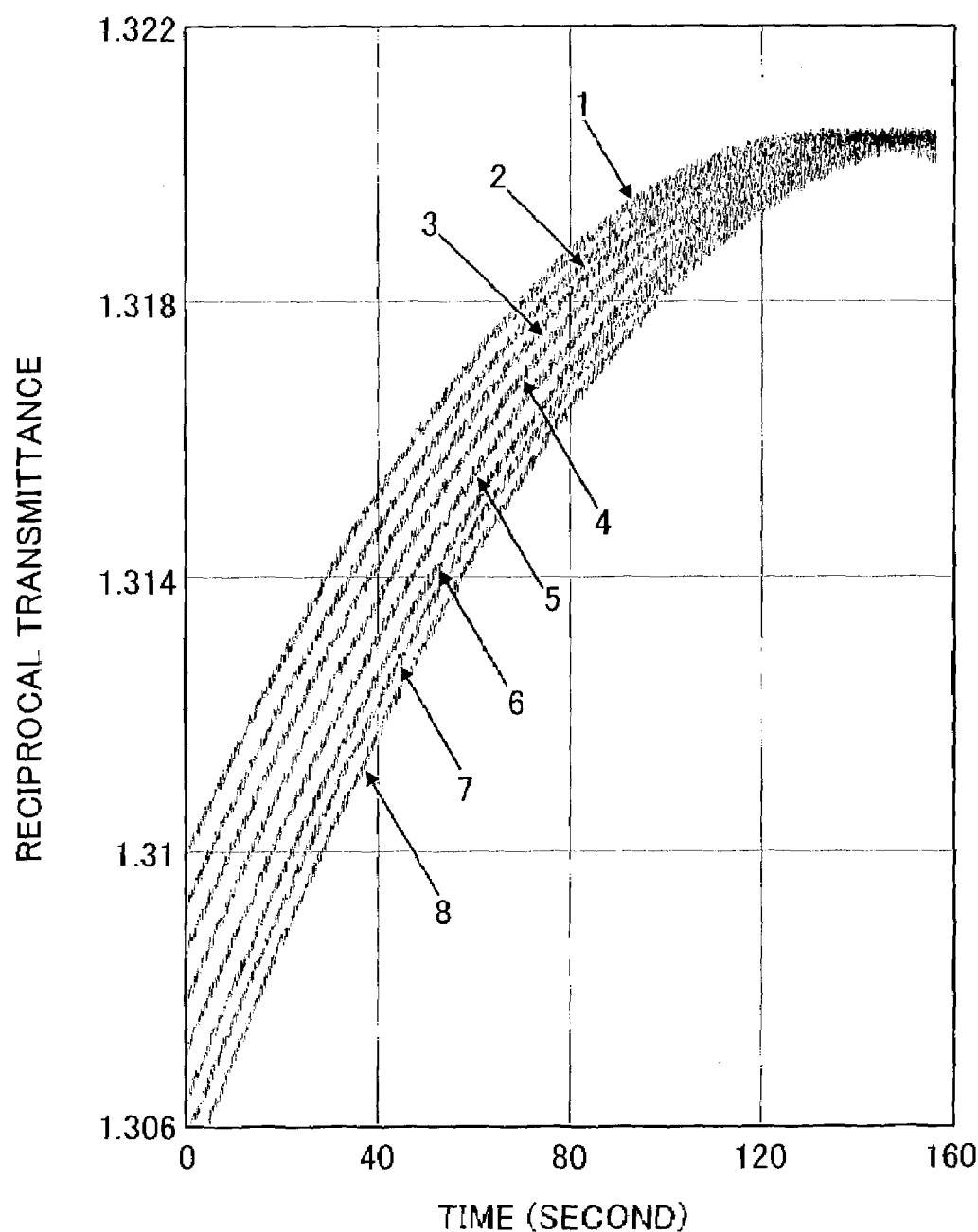
FIG. 4 is an optical signal measurement graph showing reciprocal transmittance values for 8 channels of light detected by a photodiode when single-layer film made of $Ta_2O_5$ is formed using the optical film thickness controlling apparatus shown in FIG. 3.

FIG. 4 shows reciprocal transmittance curves for eight optical signals detected by the photodiode 16. As can be seen from FIG. 4, assuming that the parallel light beams applied to the substrate 23 are assigned sequential numbers (1 to 8) based on their respective sensing positions by the photodiode 16, that is, from outside to inside in the direction of the radius of the substrate 23, the eight parallel light beams achieve the peak (maximum) in this order after a lapse of about 120 seconds from a point at which 80% of the film is formed. Here, the time point at which the reciprocal transmittance curves achieve the peak can be regarded as a time point at which the thin film being formed has desired optical film thickness.

Figure 5:
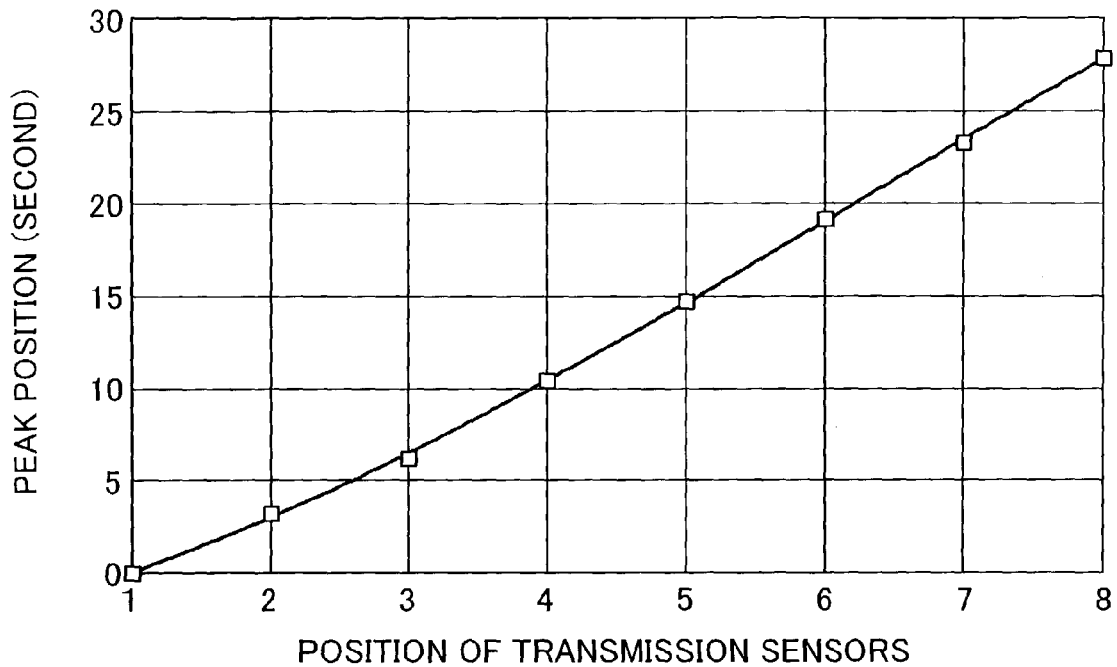
FIG. 5 is a graph showing a correlation between each of the optical signals in FIG. 4 and a predicted time when a peak is achieved for the optical signal, which is regressed to a cubic function.

FIG. 5 is a graph showing a relation between the sensing positions and predicted peak time of the parallel light beams 1 to 8, assuming that the time when the light beam 1 in FIG. 4 first achieves the peak is a zero point. The solid line in the graph is derived from regression, to a cubic function, of the correlation between the parallel light beams 1 to 8 (sensing position numbers) and their respective predicted peak times (peak positions). The regression function is expressed as follows:

$$y=-0.0227x^3+0.4204x^2+1.8345x-2.1685 \quad (10)$$

Differentiation of the formula (10) provides the following formula (11).

$$y=0.681x^2+0.8408x+1.8345 \quad (11)$$

The formula (11) is used as a function of rate of the motor driver. Based on the function, the movable shutter 29 shown in FIG. 3 is moved inwardly in the direction of the radius of the substrate 23 to gradually shut off the film formation on the film formation region of the substrate 23.

The optical film thickness of the thin film on the substrate 23 can be controlled in this way to assure uniformity of the film thickness.

Figure 6A:
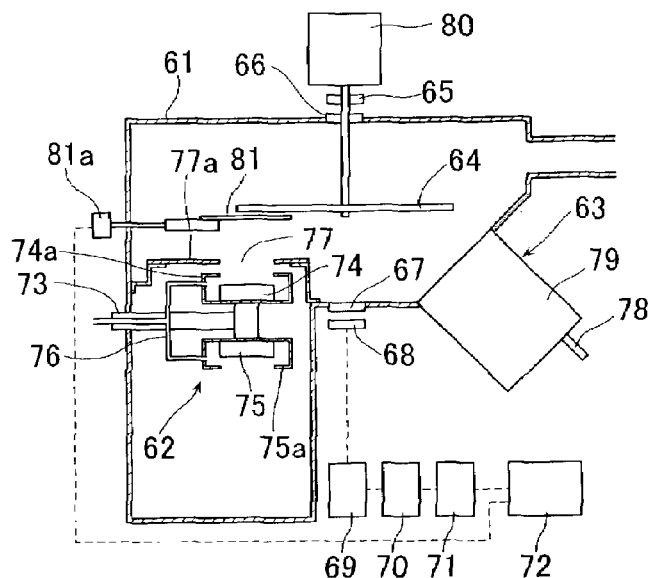
FIG. 6(a) is a schematic cross-sectional view of a dielectric multilayer film manufacturing apparatus according to the invention.
Figure 6B:
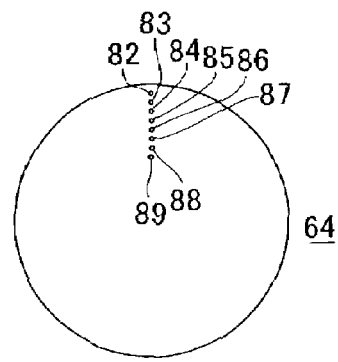
FIG. 6(b) is a top view showing a substrate in the manufacturing apparatus in FIG. 6(a) and positions of monitoring points.
Figure 6C:
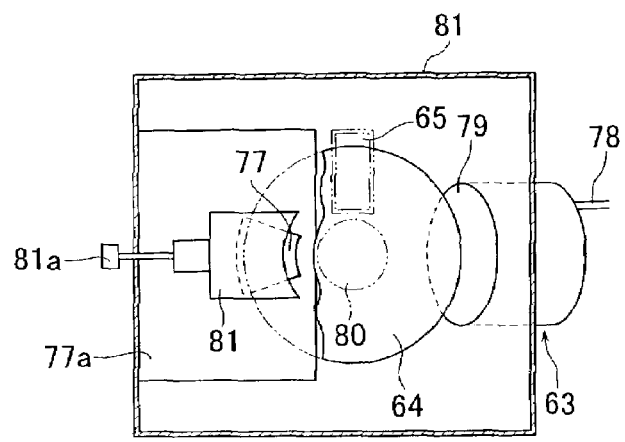
FIG. 6(c) is a top view of the manufacturing apparatus shown in FIG. 6(a)

FIG. 6(*a*) is a schematic cross-sectional view of a dielectric multilayer film manufacturing apparatus according to a first aspect of the invention. Referring to FIG. 6, in a vacuum chamber 61, a sputtering target unit 62, which is a film formation source, and an ion gun unit 63, which is a reaction source, are disposed alongside to face a rotatable substrate 64. A light emitter 65 is disposed above the rotatable substrate 64 and outside the chamber 61. Eight parallel monochromatic light fluxes from the 8-channel light emitter 65 pass through an upper light introducing window 66, the rotatable substrate 64 and a lower light introducing window 67 and are received by an 8-channel light receiver 68 located outside of the chamber 61.

The eight monochromatic light fluxes received by the light receiver 68 are connected to a computer 72 via an electrical signal line shown by a dotted line in the drawing, an 8-channel preamplifier 69, an 8-channel A/D converter 70 and a digital signal processor (DSP) 71. The computer 72 calculates a predicted time at which desired film thickness is reached to and controls the film thickness by indicating termination of the film formation based on the calculated predicted time, which is regarded as the terminating time point for film formation.

The sputtering. target unit 62 has a Ta target 74 and a Si target 75, which can be reversed in vertical position by a rotary mechanism 73. The targets 74 and 75 have protective covers 74*a* and 75*a*, respectively, and a sputtering gas pipe 76 penetrates into a space surrounded by each of the protective covers 74*a*, 75*a*. One of the targets 74, 75, which is located above the other, faces the rotatable substrate 64 via a fixed opening 77, which is a film deposition rate controlling member. The ion gun unit 63 is composed of an ECR ion gun 79 having a reactive gas pipe 78 penetrating thereinto.

The rotatable substrate 64 is rotated by a driving motor 80, and a movable shutter 81, which is a film thickness correcting member, is provided between the rotatable substrate 64 and the sputtering target unit 62.

An arrangement between the rotatable substrate 64 and the sputtering target unit 62 will be described in more detail. As shown in FIG. 6(*b*), there are provided, on the substrate 64, passing points (monitoring points) 82 to 89 of the eight monitoring monochromatic light fluxes along the radius of the substrate 64. Here, the monitoring light fluxes passing through the monitoring points are arranged in such an order that the wavelengths thereof become longer from the monitoring point 82 to the monitoring point 89.

FIG. 6(*c*) is a top view of the apparatus 61 including this substrate 64. In this drawing, the sputtering targets 74, 75 (not shown in the drawing) are disposed at the bottom, a planar plate 77*a* having the fixed opening 77 formed therein is disposed above the sputtering targets, the movable shutter 81 is disposed above the planar plate 77*a*, and the rotatable substrate 64 is disposed above the movable shutter 81. The above-described fixed opening 77 is intended to control the film deposition rate of the film formed on the monitoring region of the substrate 64. In this embodiment, the fixed opening 77 is shaped into a sector along an arc of the rotating substrate circle, in order for the film deposition rate at the outer edge of the rotating substrate circle to be higher than that at the inner edge thereof. By the action of a feed screw (not shown in the drawing) driven by the driving motor 81*a* located outside the apparatus, the movable shutter 81 having an arc-shaped tip edge is moved linearly along the radius of the rotating substrate circle having the passing points 82 to 89 (not shown in the drawing) of the monitoring monochromatic light fluxes. This action enables the movable shutter 81 to shut off the film formation performed through the fixed opening 77. The linear motion of the movable shutter 81 is controlled from the outside of the apparatus according to instructions from the computer 72 associated with the light receiver 68.

When the dielectric multilayer film manufacturing apparatus shown in FIG. 6(*a*) performs the film thickness control, a predetermined pressure state is established in the chamber 61 by the action of a vacuum pump (not shown in the drawing). Then, the product substrate 64 is rotated by the driving motor 80. Then, eight monitoring monochromatic light fluxes from the light emitter 65 are made to pass through the light receiver 68 via the upper light introducing window 66, the rotatable substrate 64 and the lower light introducing window 67. Here, the eight monitoring monochromatic light beams comprise four sets of two channels of monochromatic light beams, the four sets having different monitoring wavelengths, and each set of two channels having the same wavelength. The movable shutter 81 is kept outside of the fixed opening 77 so as to make the rotatable substrate 64 and the Ta target 74 or Si target 75 face each other without obstruction. Argon gas is introduced into the vicinity of the target 74 or 75 via the sputtering gas pipe 76, and a predetermined cathode power is supplied to start sputtering film formation. In this process, mixture gas containing oxygen gas and argon gas is introduced into the ECR ion gun 79 to make the ECR ion gun 79 to release neutral radical oxygen, thereby causing oxidation of the metal species consisting of Ta or Si deposited on the substrate 64.

Alternate multilayer film comprising $Ta_2O_5$ film having a high refractive index and $SiO_2$ film having a low refractive index is formed on the product substrate 64 by selectively adopting one of the Ta target 74 and the Si target 75. As described above, it is essential to control the optical film thickness of each constituent layer of the alternate multilayer film with high precision.

Therefore, the time point at which the sputtering film formation by the target 74 or 75 is defined as a start point of the film formation time required for increasing the film thickness. The eight monitoring monochromatic light beams, which are parallel light fluxes of the above-described four monitoring wavelengths, each of which is assigned to two of the light fluxes, pass through the rotatable substrate 64 and then are received by the light receiver 68. Then, each monochromatic light beam is converted into a voltage signal by the 8-channel preamplifier 69. The voltage signal is converted into a digital numeric signal by the 8-channel A/D converter 70. The digital numeric signal is inputted to the DSP 71, where the signal is regressed to a quadratic function, a domain of which is a time period beyond 80% of the film formation time, based on the formula (5).

Regarding the predicted time when desired film thickness is reached to, which is thus obtained as the terminating time point for film formation for the monitoring region for each monitoring wavelength, the computer 72 instructs the movable shutter 81 to move so that the tip portion thereof covers the monitoring point in the monitoring region at which the film formation is to be terminated. In this way, the film formation at the monitoring region is shut off.

According to the invention, due to the sector-shaped fixed opening 77 that controls the film deposition rate and the arrangement of the monitoring wavelengths, a monitoring point on the outer edge of the rotating substrate circle achieves the peak earlier. Therefore, the movable shutter 81 controlled in rate by an instruction of the computer 72 moves in one direction from the outer edge to the inner edge of the rotating substrate circle.

Once the film formation at the monitoring regions for all the monitoring wavelengths is terminated in this way, the target 75 or 74 in the target unit 62, which has been idle in the lower position, is lifted to the upper position for forming the next surface layer film. Then, the next film formation is performed in the same manner as described above. By repeating such a peak controlling process, lamination at each monitoring region is independently completed.

On the other hand, the time-varying optical film thickness can be calculated from an initial transmittance, a transmittance obtained when the next peak is achieved and a transmittance during the film formation. Furthermore, the film deposition rate can be obtained from a differential of the optical film thickness or a difference between optical film thicknesses calculated at regular intervals.

That is, transforming the formula (9) derived from the formula (6) provides the following formula (12).

$$\theta = \sin^{-1}[\sqrt{\{(1-T_0-1/T_\theta)/(1/T_0-1/T_{90})\}}] \quad (12)$$

For example, if the monitoring wavelength is 1550 nm and desired optical film thickness at which the film formation is to be terminated is 580 nm, the phase difference at which the film formation is to be terminated is expressed as: $\theta = 2\pi*$ (optical film thickness)/(monitoring wavelength)=134.7 (degrees). Provided that the calculated rate (optical film unit) is 1.2 nm/sec (=0.2787 degrees/sec), and the current optical film thickness is 500 nm (=116.13 degrees), the remaining time X (seconds) to the end point is expressed by the following formula (13).

$$134.7 = 116.13 + 0.2787*X \quad (13)$$

Thus, the time X is determined as: X=66.63 seconds. That is, not only the peak control but also calculation of any optical film thickness can provide the terminating time point for film formation.

Regarding the predicted time when desired film thickness is reached to, which is thus obtained as the terminating time point for film formation for the monitoring region for each monitoring wavelength, the computer 72 instructs the movable shutter 81 to move so that the tip portion thereof covers the monitoring point in the monitoring region at which the film formation is to be terminated. In this way, the film formation at the monitoring region is shut off.

Once the film formation at the monitoring regions for all the monitoring wavelengths is terminated in this way, the target 75 or 74 in the target unit 62, which has been idle in the lower position, is lifted to the upper position for forming the next surface layer film. Then, the next film formation is performed in the same manner as described above. By repeating any film formation process like this, lamination at each monitoring region is independently completed.

Figure 7A:
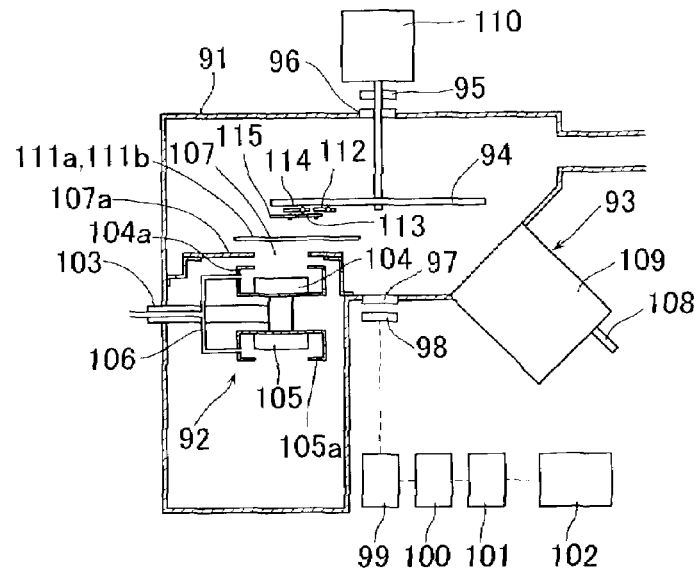
FIG. 7(a) is a schematic cross-sectional view of a dielectric multilayer film manufacturing apparatus according to the invention.

FIG. 7(a) is a schematic cross-sectional view of a dielectric multilayer film manufacturing apparatus according to a second aspect of the invention. Referring to FIG. 7, in a vacuum chamber 91, a sputtering target unit 92, which is a film formation source, and an ion gun unit 93, which is a reaction source, are disposed alongside to face a rotatable substrate 94. A light emitter 95 is disposed above the rotatable substrate 94 and outside the chamber 91. Eight parallel monochromatic light fluxes from the 8-channel light emitter 95 pass through an upper light introducing window 96, the rotatable substrate 94 and a lower light introducing window 97 and are received by an 8-channel light receiver 98 located outside of the chamber 91.

The eight monochromatic light fluxes received by the light receiver 98 are connected to a computer 102 via an electrical signal line shown by a dotted line in the drawing, an 8-channel preamplifier 99, an 8-channel A/D converter 100 and a digital signal processor (DSP) 101. The computer 102 calculates a predicted time at which desired film thickness is reached to and controls the film thickness by indicating termination of the film formation based on the calculated predicted time, which is regarded as the terminating time point for film formation.

The sputtering target unit 92 has a Ta target 104 and a Si target 105, which can be reversed in vertical position by a rotary mechanism 103. The targets 104 and 105 have protective covers 104a and 105a, respectively, and a sputtering gas pipe 106 penetrates into a space surrounded by each of the protective covers 104a, 105a. One of the targets 104, 105, which is located above the other, faces the rotatable substrate 94 via a fixed opening 107. The ion gun unit 93 is composed of an ECR ion gun 109 having a reactive gas pipe 108 penetrating thereinto.

The, rotatable substrate 94 is rotated by a driving motor 110, and variable openings 111a, 111b, which are film deposition rate controlling members, and split shutters 112 to 115, which are film thickness correcting members, are provided between the rotatable substrate 94 and the sputtering target unit 92.

Figure 7B:
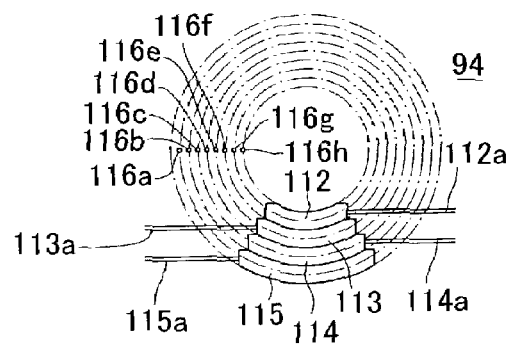
FIG. 7(b) is a top view showing a substrate and split shutters in the manufacturing apparatus in FIG. 7(a)

An arrangement between the rotatable substrate 94 and the sputtering target unit 92 will be described in more detail. As shown in FIG. 7(b), the split shutters 112, 113, 114 and 115 provided in the vicinity of the substrate 94 are independently actuated via driving shafts 112a, 113a, 114a and 115a, respectively, and configured to open or close arc-shaped opening regions formed along circumferences of concentric circles, which are drawn by the trace of each of passing points (monitoring points) 116a to 116h of eight monitoring monochromatic light fluxes on the substrate 94.

Figure 7C:
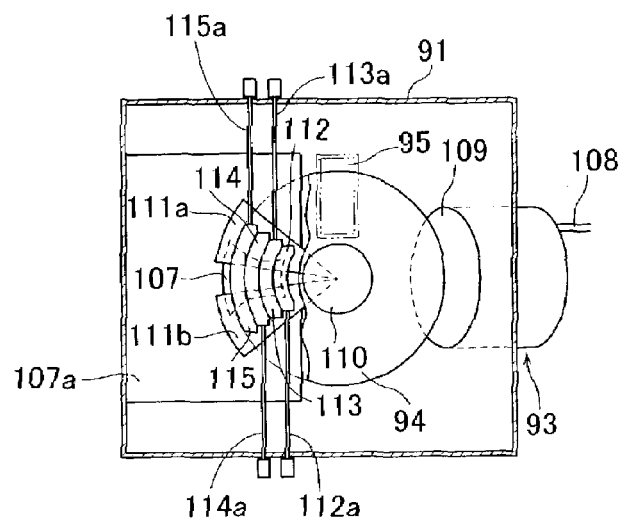
FIG. 7(c) is a top view of the manufacturing apparatus shown in FIG. 7(a)

FIG. 7(c) is a top view of the apparatus 91 including the substrate 94 and the split shutters 112 to 115. In this drawing, the sputtering targets 104, 105 (not shown in the drawing) are disposed at the bottom, a planar plate 107a having the fixed opening 107 formed therein is disposed above the sputtering targets, the variable openings 111a and 111b are disposed above the planar plate, the split shutters 112 to 115 are disposed above the planar plate, and the rotatable substrate 94 is disposed above the split shutters. The above-described fixed opening 107 is intended to control an evaporated material distribution to provide optical properties in a wider range. The opening may be a variable one. The variable openings 111a, 111b are intended to reduce the film deposition rate in order to control the film thickness with high precision when the film formation is nearly ended.

The variable openings replace the sputtering targets 104, 105, because reducing the film deposition rate by adjusting the outputs of the sputtering targets does not provide an immediate effect and takes a long time, resulting in lower productivity. That is, the film formation is initially performed at a high film deposition rate, and when the film formation is nearly ended, the film thickness is precisely controlled by reducing the degrees of opening of the variable openings 111a, 111b to decrease the film deposition rate. The split shutters 112, 113, 114 and 115 are independently retracted or extruded via the driving shafts 112a, 113a, 114a and 115a, respectively, to open or close the arc-shaped opening regions formed along the circumferences of the concentric circles, which are drawn by the trace of each of passing points (not shown in the drawing) 116a to 116h of the monitoring monochromatic light fluxes on the substrate 94, thereby shutting off the film formation at the opening regions. The degrees of opening of the variable openings 111a, 111b and opening/closing of the split shutters are controlled from the outside of the apparatus according to instructions from the computer 102 associated with the light receiver 98.

When the dielectric multilayer film manufacturing apparatus shown in FIG. 7(a) performs the film thickness control, a predetermined pressure state is established in the chamber 91 by the action of a vacuum pump (not shown in the drawing). Then, the product substrate 94 is rotated by the driving motor 110. Then, eight monitoring monochromatic light fluxes from the light emitter 95 are made to pass through the light receiver 98 via the upper light introducing window 96, the rotatable substrate 94 and the lower light introducing window 97. Here, the eight monitoring monochromatic light beams comprise four sets of two channels of monochromatic light beams, the four sets having different monitoring wavelengths, and each set of two channels having the same wavelength. Predetermined degrees of opening of the variable openings 111a, 111b are kept and the split shutters 112 to 115 are fully opened so as to make the rotatable substrate 94 and the Ta target 104 or Si target 105 face each other without obstruction. Argon gas is introduced into the vicinity of the target 104 or 105 via the sputtering gas pipe 106, and a predetermined cathode power is supplied to start sputtering film formation. In this process, mixture gas containing oxygen gas and argon gas is introduced from a reactive gas pipe 108 into the ECR ion gun 109 to make the ECR ion gun 109 release neutral radical oxygen, thereby causing oxidation of the metal species consisting of Ta or Si deposited on the substrate 94.

Alternate multilayer film comprising $Ta_2O_5$ film having a high refractive index and $SiO_2$ film having a low refractive index is formed on the product substrate 94 by selectively adopting one of the Ta target 104 and the Si target 105. As described above, it is essential to control the optical film thickness of each constituent layer of the alternate multilayer film with high precision.

Therefore, the time point at which the sputtering film formation by the target 104 or 105 is defined as a start point of the film formation time required for increasing the film thickness. The eight monitoring monochromatic light beams, which are parallel light fluxes of the above-described four monitoring wavelengths, each of which is assigned to two of the light fluxes, pass through the rotatable substrate 94 and then are received by the light receiver 98. Then, each monochromatic light beam is converted into a voltage signal by the 8-channel preamplifier 99. The voltage signal is converted into a digital numeric signal by the 8-channel A/D converter 100. The digital numeric signal is inputted to the DSP 101, where the signal is regressed to a quadratic function, a domain of which is a film formation time starting from a time point when the variable openings are activated, based on the formula (5).

Regarding the film formation time corresponding to a maximum or minimum of the quadratic regression function as predicted time when desired film thickness is reached to, the computer 102 instructs the split shutters 112 to 115 to be closed, thereby shutting off the film formation at the arc-shaped monitoring regions.

Once the film formation at the monitoring regions for all the monitoring wavelengths is terminated in this way, the target 105 or 104 in the target unit 92, which has been idle in the lower position, is lifted to the upper position for forming the next surface layer film. Then, the next film formation is performed in the same manner as described above. By repeating such a process, lamination at each monitoring region is independently completed.

EXAMPLES

In Examples 1 to 4, the precision of control of the optical film thickness of optical thin film obtained using the optical film thickness controlling apparatus that carries out the controlling method according to the invention shown in FIG. 3 will be discussed.

Example 1

In the film thickness controlling apparatus shown in FIG. 3, one incident light beam (wavelength λ: 1552 nm), which is not branched, was launched onto the substrate, and motion of the movable shutter 29 was terminated. In this state, single-layer film of $Ta_2O_5$ was formed by sputtering on the substrate 23. Provided that the $Ta_2O_5$ film is a high-refractive-index layer and a state where the optical film thickness of the $Ta_2O_5$ film is the λ/4 is denoted by a character "H", an H single-layer film and an HH single-layer film were formed on a glass substrate. In the formation, when forming the H single-layer film, prediction of a film growing time when the measured transmittance achieves a bottom (minimum in a quadratic regression function) was attempted, and when forming the HH single-layer film, prediction of a film growing time when the measured transmittance achieves a peak (maximum in the quadratic regression function) was attempted.

Here, the bottom and peak described above are related with a variation of the measured transmittance. It should be noted that, if the reciprocal transmittance is to be calculated based on the transmittance, the bottom and peak need to be handled in a reversed way. To avoid any confusion, it is consistently considered. in this example that the bottom and the peak are related with the transmittance. The same holds true for the following examples.

Assuming that the deposition rate of $Ta_2O_5$ was 0.17 nm/sec, and using measured data group obtained in a period from a time when the optical film thickness of the $Ta_2O_5$ film being formed achieved 80% of the λ/4 to a time preceding by 2 seconds, relative to the actual peak or bottom, the data group was inputted to the CPU 18 for data processing and regressed to a quadratic function of reciprocal transmittance based on the formula (5).

Then, an inspection was performed in such a manner that a determined value of the film growing time at the peak or bottom, which were determined after the peak or bottom, were compared with a predicted value of the film growing time at the peak or bottom, which were derived from the quadratic regression function. Plotting off of a mean value obtained by performing the inspection 10 times from the above-mentioned determined value is regarded as a mean error, and the mean error and the standard deviation are shown in the following table 1.

In this example, the regression was performed on the measured data group obtained up to 2 seconds before the actual peak or bottom. However, it has been confirmed that the measured data group obtained up to 30 seconds before the actual peak or bottom provides the same result.

Comparative Example 1

The film growing time of the H single-layer film at the bottom and the film growing time of the HH single-layer film at the peak were predicted in the same manner as in Example 1 except that the regression function was a quadratic function of transmittance. The mean error and the standard deviation obtained in this example are shown in the following table 1.

TABLE 1

| | Regression scheme | | H: regression at bottom | HH: regression at peak |
|---|---|---|---|---|
| Example 1 | Squared reciprocal transmittance | Mean error | 2.4 nm | 2.6 nm |
| | | Standard deviation | 3.5 nm | 0.1 nm |
| Comparative Example 1 | Squared transmittance | Mean error | 1.8 nm | 4.2 nm |
| | | Standard deviation | 3.1 nm | 2.5 nm |

As can be seen from the table 1, Comparative Example 1 provided a more accurate value than in Example 1 only when the film formation time of the H single-layer film at the bottom was predicted. However, in all the other cases, Example 1, in which the regression function is a function of reciprocal transmittance, provided a higher accuracy than in Comparative Example 1.

Example 2

Using an optical film thickness controlling apparatus, which is the same as that in Example 1 shown in FIG. 3 except that the sputtering device is replaced with a reactive sputtering device, various multilayer films were formed on a glass substrate (BK7). The multilayer films each comprised alternate layers of $Ta_2O_5$ film, which is a high-refractive-index layer (H), and $SiO_2$ film, which is a low-refractive-index layer (L), and the film growing time when the peak or bottom is achieved was predicted for each of the multilayer films. The multilayer films used are as follows. Characters (P) and (B) described following the alternate layers indicate that the predicted time is a time when the peak is achieved and that the predicted time is a time when the bottom is achieved, respectively.

H(B), HH(P), HL(P), HLL(B), HLH(B), HLHH(P), HLHL(P),
HLHLL(B), HLHLH(B), HLHLHH(P), HLHLHL(P), HLHLHLL(P),
HLHLHLH(B), HLHLHLHH(P)

In this example, it was assumed that the deposition rate of $Ta_2O_5$ was 0.17 nm/sec, and measured data group obtained in a period from a time when the optical film thickness of the $Ta_2O_5$ film being formed achieved 85% of the λ/4 to a time preceding by 2 seconds, relative to the actual peak or bottom was used. The data group was inputted to the CPU 18 for data processing and regressed to a quadratic function of reciprocal transmittance based on the formula (5).

Figure 8:
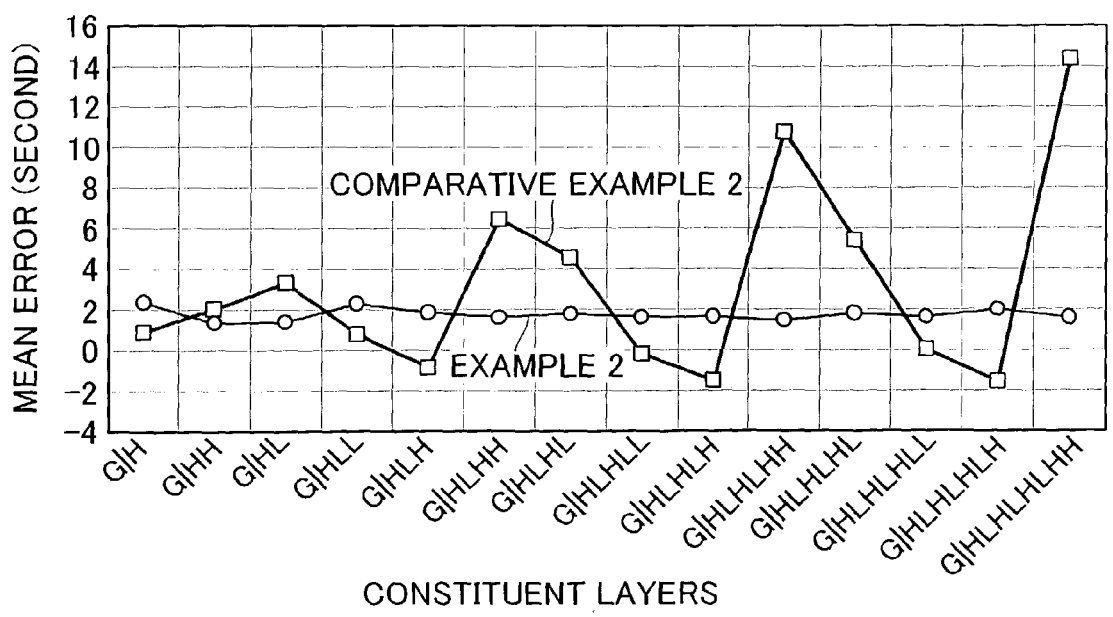
FIG. 8 is a graph for comparison of precision between quadratic function regression of the transmittance of multilayer film composed of $Ta_2O_5$ film (H) and $SiO_2$ film (L) in Example 2 and quadratic function regression of the reciprocal transmittance of the multilayer film.

A graph labeled "Example 2" in FIG. 8 shows a correlation between layer arrangements of the multilayer films, which are plotted on the horizontal axis, and regression errors thereof (mean errors in FIG. 8), which are plotted on the vertical axis.

Comparative Example 2

The film growing time of each of the multilayer films in Example 2 at the peak or bottom was predicted in the same manner as in Example 2 except that the regression function was a quadratic function of transmittance. The data used was obtained by performing inspection 10 times. A graph labeled "Comparative Example 2" in FIG. 8 shows a correlation between layer arrangements of the multilayer films, which are plotted on the horizontal axis, and regression errors thereof, which are plotted on the vertical axis.

Comparison between Example 2 and Comparative Example 2 shows the following facts. In Comparative Example 2, that is, if the regression function is a quadratic function of transmittance, the plotting off from the determined value of the film growing time at a peak or bottom (the value lying on the line of a mean error of 0 seconds) is small for multilayer film composed of a smaller number of layers. However, for multilayer film composed of a larger number of layers, the error of the predicted value of the film growing time at a peak appearing following an increase of transmittance tends to be large.

And, in Example 2, that is, if the regression function is a quadratic function of reciprocal transmittance, a high accuracy is maintained for every multilayer film with stability.

Example 3

Instead of the various multilayer films in Example 2, single-layer film composed of $Ta_2O_5$ film was formed using the reactive sputtering apparatus in Example 2, and the film growing time when a peak or bottom is achieved was predicted in the same optical film thickness controlling method.

In this example, measured data group obtained on and after a time point when the optical film thickness of the $Ta_2O_5$ film being formed achieved a particular value in a range of a predetermined percentage (70 to 90%) of the λ/4 was used. The data group was inputted to the CPU 18 for data processing and regressed to a quadratic function of reciprocal transmittance based on the formula (5), and the quadratic regression function was used for prediction.

Figure 9:
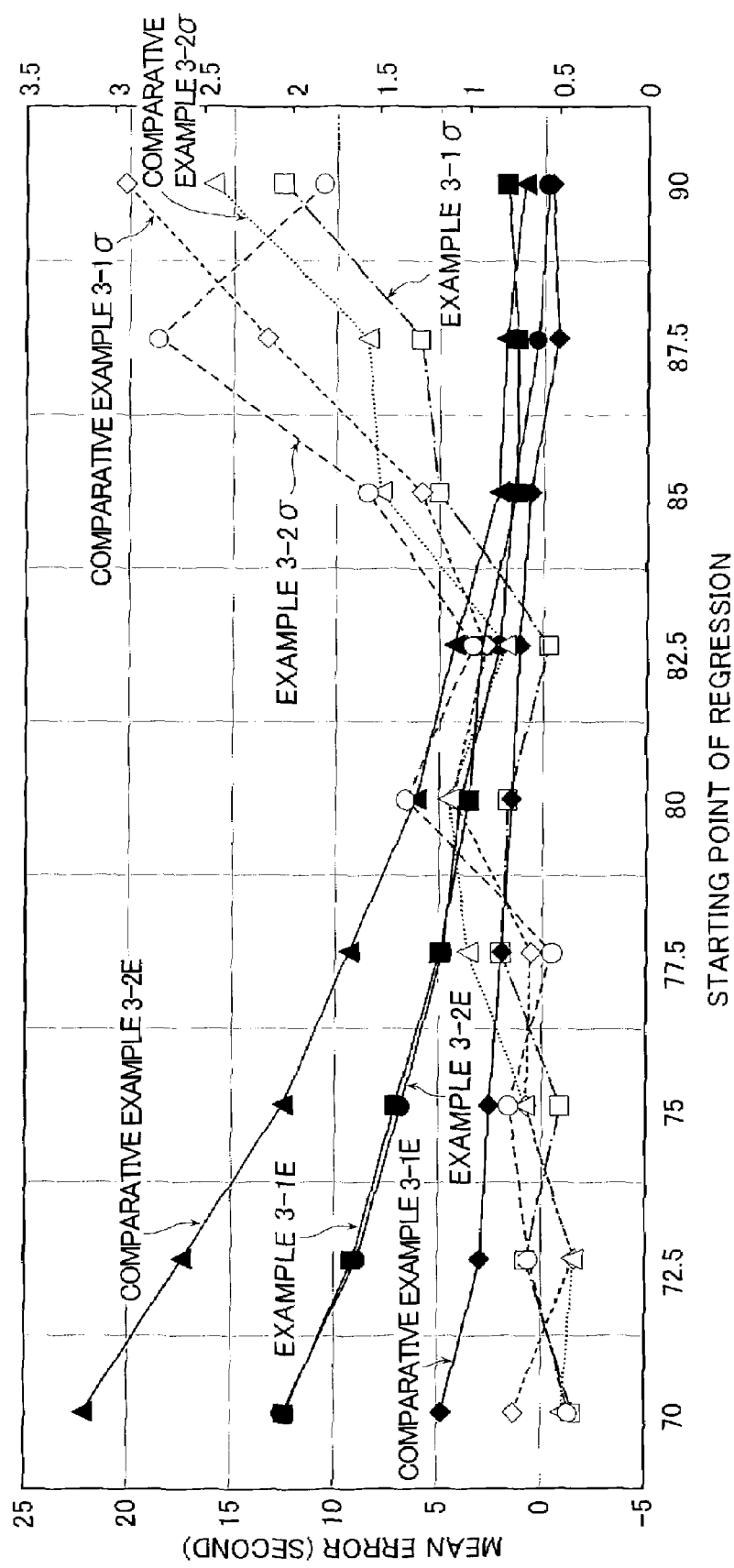
FIG. 9 is a graph for comparison of precision based on a regression range between quadratic function regression of the transmittance of single-layer film composed of $Ta_2O_5$ film manufactured in Example 3 and quadratic function regression of the reciprocal transmittance of the single-layer film.

In FIG. 9, in which a regression error is plotted on the left-side vertical axis and a regression starting point (a particular length of 70 to 90% of the λ/4) is plotted on the horizontal axis, a graph labeled "Example 3-1E" in FIG. 9 shows a property resulted when the prediction at a bottom was performed, and a graph labeled "Example 3-2E" shows a property resulted when the prediction at a peak was performed.

FIG. 9 is a combined graph in which a standard deviation is plotted on the right-side vertical axis. In this drawing, the standard deviation at the prediction time in Example 3-1E is labeled "Example 3-1σ", and the standard deviation at the prediction time in Example 3-2E is labeled "Example 3-2σ".

Comparative Example 3

The film growing time was predicted in the same manner as in Example 3 except that a quadratic regression function of transmittance was used in regression. A graph labeled "Comparative Example 3-1E" in FIG. 9 shows a property resulted when the prediction at a bottom was performed, and a graph labeled "Comparative Example 3-2E" in FIG. 9 shows a property resulted when the prediction at a peak was performed.

Furthermore, in FIG. 9, the standard deviation at the prediction time in Comparative Example 3-1E is labeled "Comparative Example 3-1σ", and the standard deviation at the prediction time in Comparative Example 3-2E is labeled "Comparative Example 3-2σ".

Comparison between Example 3 and Comparative Example 3 shows that, in both the examples, if the regression starting point approaches the peak or bottom (the regression starting point approaches 100%), the accuracy becomes higher, although the standard deviation becomes larger and the dispersion is increased. In particular, in the prediction at a peak in Comparative Example 3 (Comparative Example 3-2E), an adequate accuracy is not provided.

It is proved that, in the case where the quadratic regression curve of reciprocal transmittance in Example 3 was used, the regression is desirably started at a point in a range of 75 to 90% of the λ/4.

Example 4

A BPF (band pass filter) was prepared according to the film thickness controlling method carried out by the optical film thickness controlling apparatus shown in FIG. 3. The band pass filter was a 7-cavity band pass filter comprising alternate 155 layers of $Ta_2O_5$ films (H) and $SiO_2$ films (L) The band pass filter was arranged as follows.

Air|ARC|HLHLHLHL2HLHLHLHLHL
HLHLHLHL0.39H0.2065L(A)0.39H(B)
    L2HL0.39H0.2065L(A)0.39H(B)LHL
HLHLHL
HLHLHLHLHL2HLHLHLHLHLHL
HLHLHLHLHL2HLHLHLHLHLHL
HLHLHLHLHL2HLHLHLHLHLHL
HLHLHLHL0.39H0.2065L(A)0.39H(B)
    L2HL0.39H0.2065L(A)0.39H(B)LHL
HLHLHL
HLHLHLHL2HLHLHLHLHL|Glass In this arrangement, an index "B" assigned to $Ta_2O_5$ film indicates that the deposition rate thereof was calculated by temporal differentiation of the optical film thickness obtained by conversion of the reciprocal transmittance, and not by quadratic function regression by the peak or bottom control, and the film formation thereof was terminated by predicting the terminating time point for film formation based on the deposition rate by any film thickness controlling method.

In the arrangement, an index "A" assigned to $SiO_2$ film indicates that the sputtering rate was previously set, and the film thickness thereof was controlled based on the deposition time.

The film thickness of the band pass filter thus obtained was controlled in such a condition that a monitoring wavelength of 1552 nm was used, a glass disk having a diameter of 300 mm and having an ARC (anti-reflection coating) on a rear surface thereof was used, and the transmitted light measuring sensors (sensors in the photodiode 16 in FIG. 3) were disposed at eight points at regular intervals of 10 mm from a point 10 mm distant from the outer perimeter of the disk.

Figure 10:
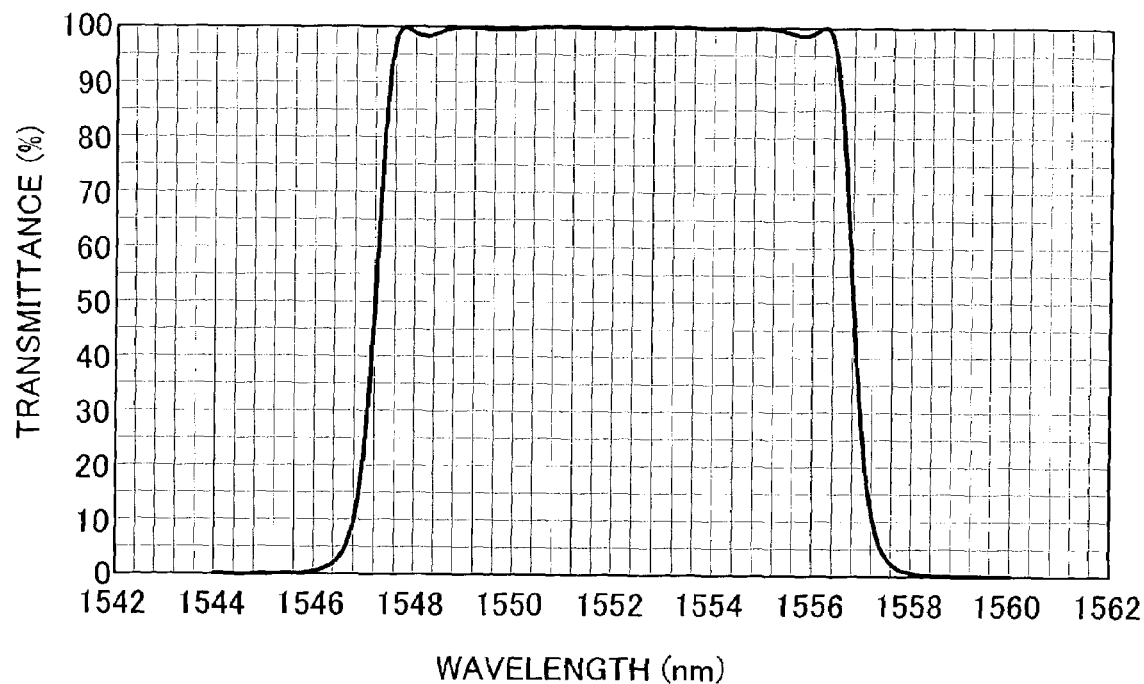
FIG. 10 shows a spectrum for a band pass filter manufactured in Example 4.

The band pass filter has a spectrum as shown in FIG. 10, and it has been confirmed that the band pass filter is dielectric film having a satisfactory property over the whole monitoring range.

Now, in Examples 5 to 7, the precision of control of the optical film thickness of an optical thin film product provided by the dielectric multilayer film manufacturing apparatus that carries out the controlling method according to the invention shown in FIG. 6 will be discussed.

Example 5

A medium band pass filter was prepared by the dielectric multilayer film manufacturing apparatus in FIG. 6, the medium band pass filter comprising a stack of alternate layers of $Ta_2O_5$ film, which is a high-refractive-index layer, and $SiO_2$ film, which is a low-refractive-index layer, and the optical film thickness of all the constituent layers being an integral multiple of the λ/4 (λ: a monitoring wavelength). Monitoring wavelengths used were 1552.52 nm, 1554.12 nm, 1555.72 nm and 1557.32 nm. The optical thin film was arranged as follows.

Glass product substrate (BK7) with anti-reflection
        coating|(HL)³L(HL)⁶L(HL)⁶L(HL)³|air A design value of refractive index was set to 1.444 for the low-refractive-index layer, 2.08 for the high-refractive-index layer and 1.5 for the product substrate (BK7).

Referring to FIG. 6(b), the monitoring point 82 associated with the monitoring monochromatic light beam channel 1 was set at a position 5 mm inwardly distant from the outer perimeter of the product substrate 64 having a diameter of 300 mm. The monitoring points 83 to 89 associated with the channels 2 to 8, respectively, were set at positions at regular intervals of 10 mm from the monitoring point 82 in a direction toward the center of the rotating substrate circle.

Of the eight monochromatic light fluxes emitted from a tunable laser light source, which is equivalent to the light emitter 65 in FIG. 6, the channels 1 and 2 were assigned to the monochromatic light flux having a monitoring wavelength of 1552.52 nm, the channels 3 and 4 were assigned to the monochromatic light flux having a monitoring wavelength of 1554.12 nm, the channels 5 and 6 were assigned to the monochromatic light flux having a monitoring wavelength of 1555.72 nm, and the channels 7 and 8 were assigned to the monochromatic light flux having a monitoring wavelength of 1557.32 nm. For the light fluxes received by the light receiver 68, the transmittances were calculated by the DSP 71. Using the calculated transmittances, quadratic function regression in the vicinity of a peak of the transmittance curve was performed, thereby calculating a predicted time when the peak is achieved. The predicted time was regarded as a terminating time point for film formation.

Figure 11:
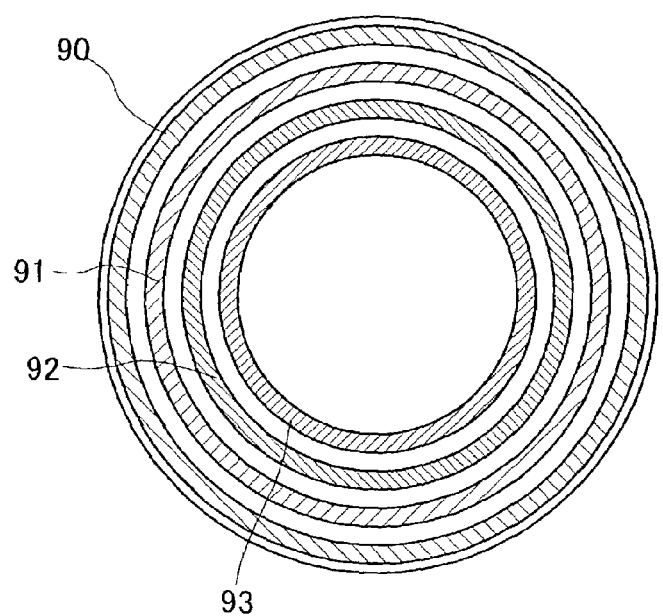
FIG. 11 is a conceptual diagram showing optical property regions on a substrate provided in an Example 5.

FIG. 11 shows a property distribution on the product substrate 64 obtained by repeatedly performing the above-described process. As shown in FIG. 11, each of the annular band regions 90 to 93 having a width of about 10 mm has a uniform optical property.

Figure 12:
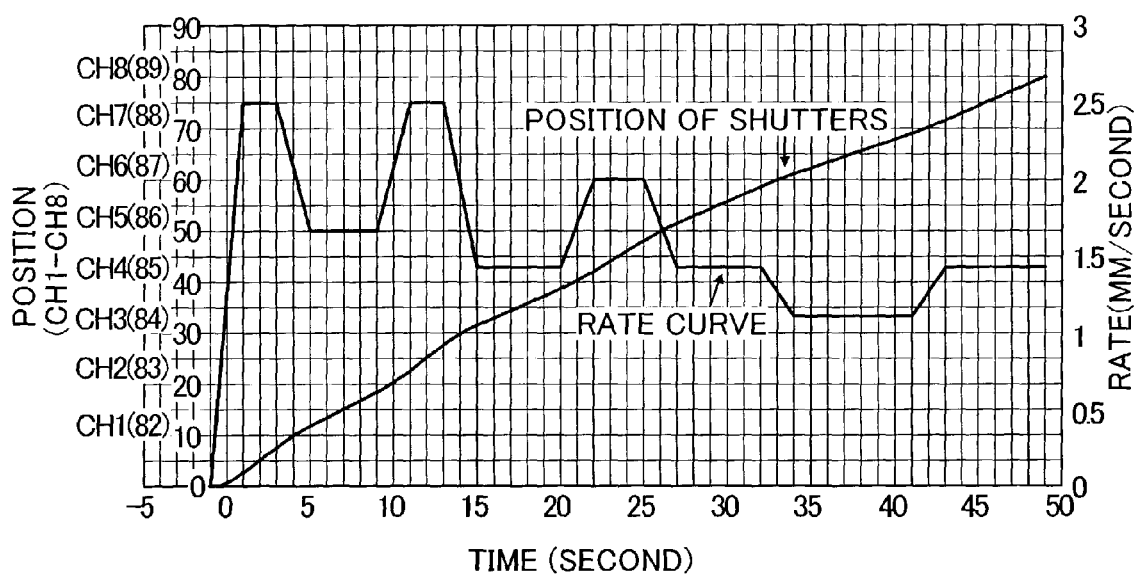
FIG. 12 is a graph illustrating actuation of a movable shutter in Example 5.

FIG. 12 is a graph illustrating the motion of the movable shutter 81 in response to an indication of the terminating time point for film formation, the indication being obtained by peak control on the third layer, which is the low-refractive-index layer. As can be seen from the graph, the movable shutter 81 is controlled so as to move at a variable rate in one direction from the outer perimeter to the inner perimeter of the rotating substrate circle.

Figure 13:
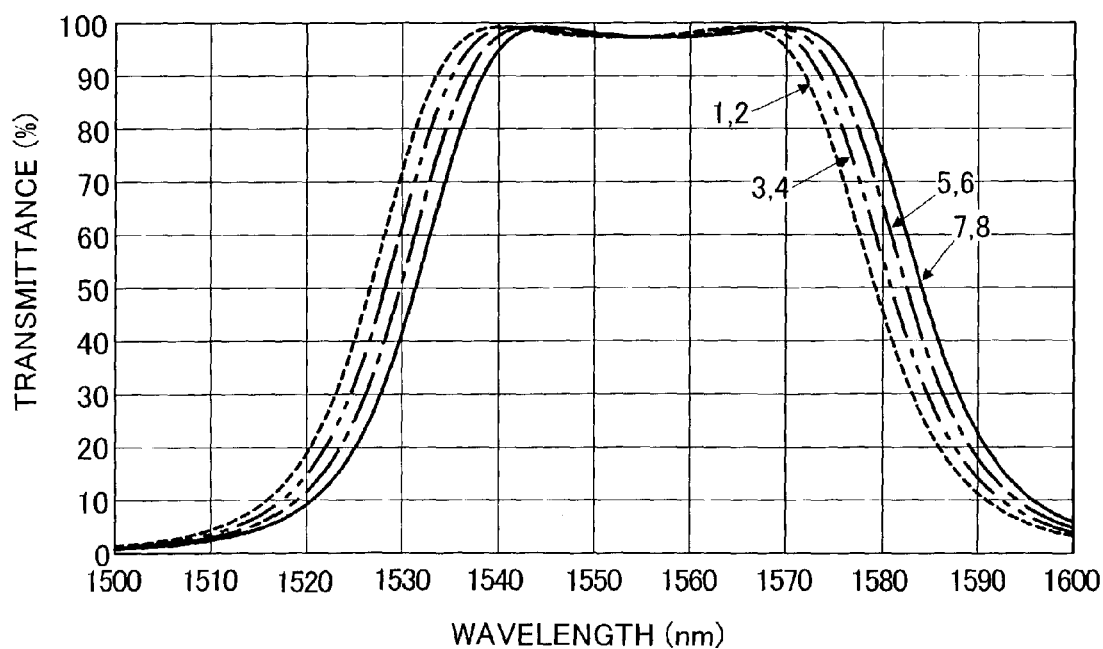
FIG. 13 is a graph showing a spectral transmittance property of a medium band pass filter provided in Example 5.

FIG. 13 shows spectral transmittance properties for the monitoring regions on the substrate associated with the channels 1 to 8. It can be seen that a satisfactory optical product serving as a medium band pass filter is provided.

Example 6

A medium band pass filter was prepared by the dielectric multilayer film manufacturing apparatus in FIG. 6, the medium band pass filter comprising a stack of alternate layers of $Ta_2O_5$ film, which is a high-refractive-index layer, and $SiO_2$ film, which is a low-refractive-index layer, and the optical film thickness of all the constituent layers being an integral multiple of the $\lambda/4$ ($\lambda$: a monitoring wavelength). Monitoring wavelengths used were 1552.52 nm, 1553.32 nm, 1554.12 nm and 1554.92 nm. The optical thin film was arranged as follows.:

Glass product substrate (BK7) with anti-reflection coating|(HL)$^8$L(HL)$^{16}$L(HL)$^{16}$L(HL)$^8$|air A design value of refractive index was set to 1.444 for the low-refractive-index layer, 2.08 for the high-refractive-index layer and 1.5 for the product substrate (BK7).

Referring to FIG. 6(*b*), the monitoring point 82 associated with the monitoring monochromatic light beam channel 1 was set at a position 5 mm inwardly distant from the outer perimeter of the product substrate 64 having a diameter of 300 mm. The monitoring points 83 to 89 associated with the channels 2 to 8, respectively, were set at positions at regular intervals of 10 mm from the monitoring point 82 in a direction toward the center of the rotating substrate circle.

Of the eight monochromatic light fluxes emitted from a tunable laser light source, which is equivalent to the light emitter 65 in FIG. 6, the channels 1 and 2 were assigned to the monochromatic light flux having a monitoring wavelength of 1552.52 nm, the channels 3 and 4 were assigned to the monochromatic light flux having a monitoring wavelength of 1553.32 nm, the channels 5 and 6 were assigned to the monochromatic light flux having a monitoring wavelength of 1554.12 nm, and the channels 7 and 8 were assigned to the monochromatic light flux having a monitoring wavelength of 1554.92 nm. For the light fluxes received by the light receiver 68, the reciprocal transmittances were calculated from the transmittances calculated by the DSP 71. Using the calculated reciprocal transmittances, quadratic function regression in the vicinity of a peak of the reciprocal transmittance curve was performed, thereby calculating a predicted time when the peak is achieved. The predicted time was regarded as a terminating time point for film formation.

Figure 14:
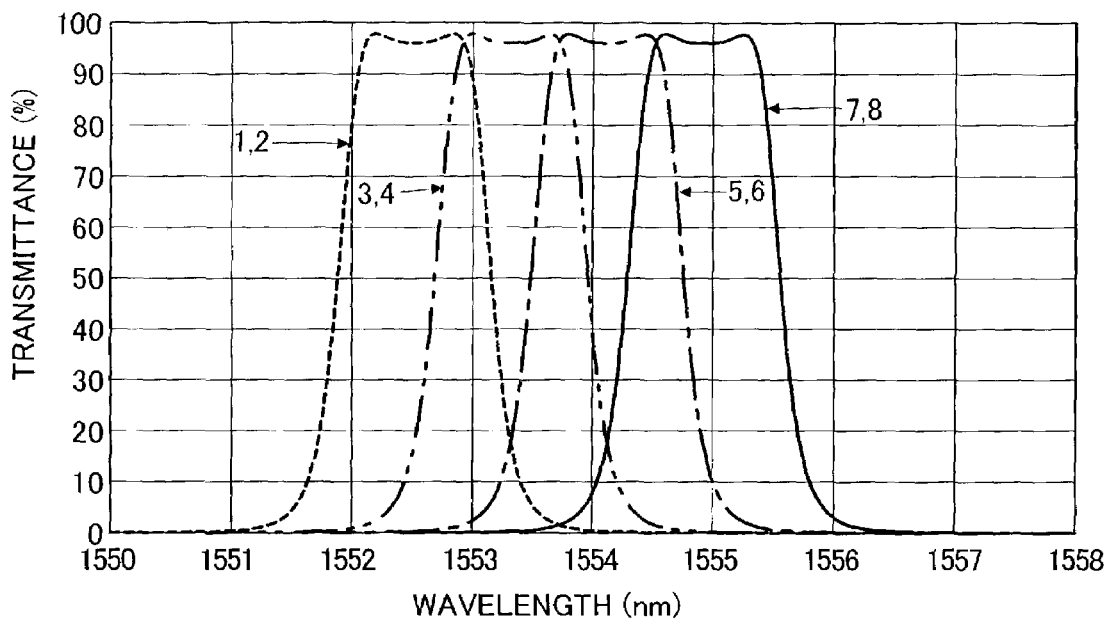
FIG. 14 is a graph showing a spectral transmittance property of a narrow-band pass filter provided in Example 6.

FIG. 14 shows spectral transmittance properties for the monitoring regions on the substrate associated with the channels 1 to 8. It can be seen that a satisfactory optical product serving as a medium band pass filter is provided.

Example 7

Anti-reflection film was prepared by the dielectric multilayer film manufacturing apparatus in FIG. 6, the anti-reflection film comprising alternate layers of $Ta_2O_5$ film, which is a high-refractive-index layer, and $SiO_2$ film, which is a low-refractive-index layer, the optical film thickness of a first and second layers not being an integral multiple of the $\lambda/4$ ($\lambda$: a monitoring wavelength), and the terminating time point for film formation of the final surface layer (second layer) being predicted by peak control. Monitoring wavelengths used were 1550 nm, 1555 nm, 1560 nm and 1565 nm. The optical thin film was arranged as follows.:

Glass product substrate (BK7) with anti-reflection coating|0.35H, 1.288L|air

A design value of refractive index was set to 1.444 for the low-refractive-index layer, 2.08 for the high-refractive-index layer and 1.5 for the product substrate (BK7).

Referring to FIG. 6(*b*), the monitoring point 82 associated with the monitoring monochromatic light beam channel 1 was set at a position 5 mm inwardly distant from the outer perimeter of the product substrate 64 having a diameter of 300 mm. The monitoring points 83 to 89 associated with the channels 2 to 8, respectively, were set at positions at regular intervals of 10 mm from the monitoring point 82 in a direction toward the center of the rotating substrate circle.

Of the eight monochromatic light fluxes emitted from a tunable laser light source, which is equivalent to the light emitter 65 in FIG. 6, the channels 1 and 2 were assigned to the monochromatic light flux having a monitoring wavelength of 1550 nm, the channels 3 and 4 were assigned to the monochromatic light flux having a monitoring wavelength of 1555 nm, the channels 5 and 6 were assigned to the monochromatic light flux having a monitoring wavelength of 1560 nm, and the channels 7 and 8 were assigned to the monochromatic light flux having a monitoring wavelength of 1565 nm. For the light fluxes received by the light receiver 68, the reciprocal transmittances were calculated from the transmittances calculated by the DSP 71. For the first layer, the reciprocal transmittances were used to predict a terminating time point for film formation for 0.35 H, and for the second layer, quadratic function regression in the vicinity of a peak of the reciprocal transmittance curve was performed to calculate a predicted time when the peak is achieved, and the predicted time was regarded as a terminating time point for film formation.

Figure 15:
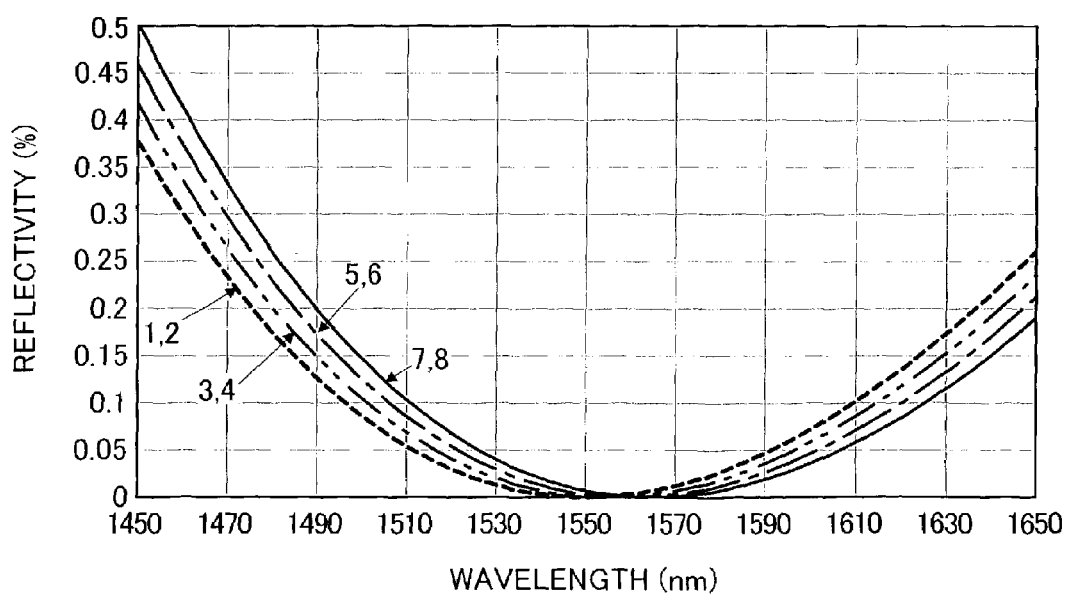
FIG. 15 is a graph showing a spectral reflectivity property of an anti-reflection film provided in Example 7.

FIG. 15 shows spectral reflectivity properties for the monitoring regions on the substrate associated with the channels 1 to 8. It can be seen that a satisfactory optical product serving as anti-reflection film is provided.

Further, in the following Examples 8 to 10, the precision of control of the optical film thickness of an optical thin film product provided by the dielectric multilayer film manufacturing apparatus that carries out the controlling method according to the invention shown in FIG. 7 will be discussed.

Example 8

A medium band pass filter was prepared by the dielectric multilayer film manufacturing apparatus in FIG. 7, the medium band pass filter comprising a stack of alternate layers of $Ta_2O_5$ film, which is a high-refractive-index layer, and $SiO_2$ film, which is a low-refractive-index layer, and the optical film thickness of all the constituent layers being an integral multiple of the $\lambda/4$ ($\lambda$: a monitoring wavelength). Monitoring wavelengths used were 1552.52 nm, 1554.12 nm, 1555.72 nm and 1557.32 nm. The optical thin film was arranged as follows.:

Glass product substrate (BK7) with anti-reflection coating|(HL)$^3$L(HL)$^6$L(HL)$^6$L(HL)$^3$|air A design value of refractive index was set to 1.444 for the low-refractive-index layer, 2.08 for the high-refractive-index layer and 1.5 for the product substrate (BK7).

Referring to FIG. 7(b), the monitoring point 116a associated with the monitoring monochromatic light beam channel 1 was set at a position 5 mm inwardly distant from the outer perimeter of the product substrate 94 having a diameter of 300 mm. The monitoring points 116b to 116h associated with the channels 2 to 8, respectively, were set at positions at regular intervals of 10 mm from the monitoring point 116a in a direction toward the center of the rotating substrate circle.

Figure 16:
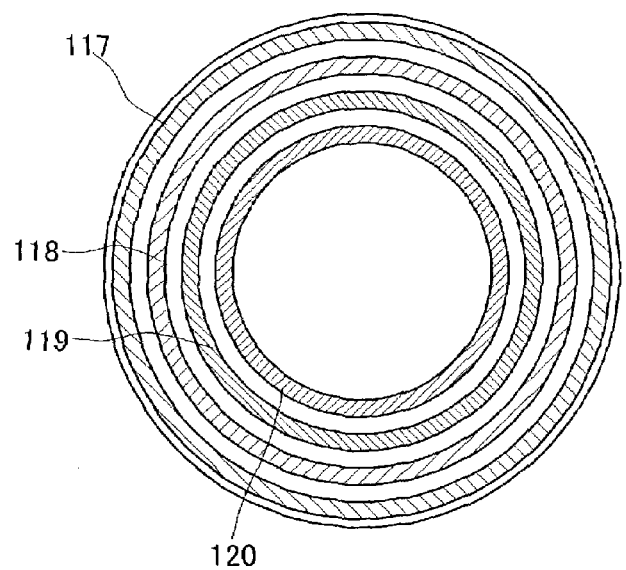
FIG. 16 is a conceptual diagram showing optical property regions on a substrate provided in Example 8.

Of the eight monochromatic light fluxes emitted from a tunable laser light source, which is equivalent to the light emitter 95 in FIG. 7, the channels 1 and 2 were assigned to the monochromatic light flux having a monitoring wavelength of 1552.52 nm, the channels 3 and 4 were assigned to the monochromatic light flux having a monitoring wavelength of 1554.12 nm, the channels 5 and 6 were assigned to the monochromatic light flux having a monitoring wavelength of 1555.72 nm, and the channels 7 and 8 were assigned to the monochromatic light flux having a monitoring wavelength of 1557.32 nm. For the light fluxes received by the light receiver 98, the transmittances were calculated by the DSP 101. Using the calculated transmittances, quadratic function regression in the vicinity of a peak of the transmittance curve was performed, thereby calculating a predicted time when the peak is achieved. The predicted time was regarded as a terminating time point for film formation. FIG. 16 shows a property distribution on the product substrate 94 obtained by repeatedly performing the process. As shown in FIG. 16, each of the annular band regions 117 to 120 having a width of about 10 mm has a uniform optical property.

Figure 17:
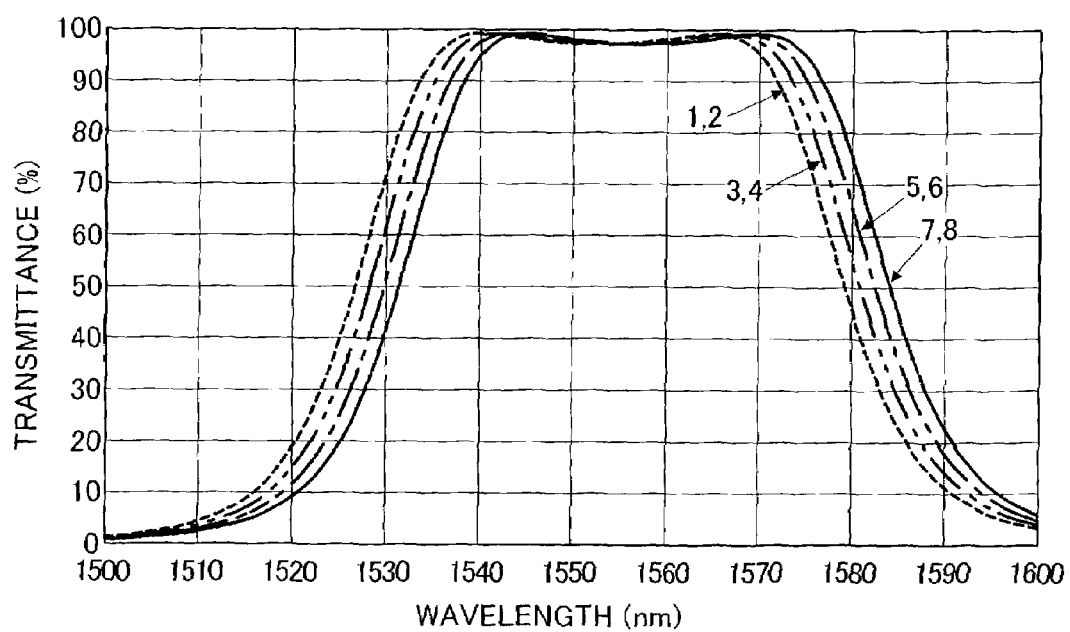
FIG. 17 is a graph showing a spectral transmittance property of a medium band pass filter provided in Example 8.

FIG. 17 shows spectral transmittance properties for the monitoring regions on the substrate associated with the channels 1 to 8. It can be seen that a satisfactory optical product serving as a medium band pass filter is provided.

Example 9

A medium band pass filter was prepared by the dielectric multilayer film manufacturing apparatus in FIG. 7, the medium band pass filter comprising a stack of alternate layers of $Ta_2O_5$ film, which is a high-refractive-index layer, and $SiO^2$ film, which is a low-refractive-index layer, and the optical film thickness of all the constituent layers being an integral multiple of the $\lambda/4$ ($\lambda$: a monitoring wavelength). Monitoring wavelengths used were 1552.52 nm, 1553.32 nm, 1554.12 nm and 1554.92 nm. The optical thin film was arranged as follows.:

Glass product substrate (BK7) with anti-reflection coating|(HL)$^8$L(HL)$^{16}$L(HL)$^{16}$L(HL)$^8$|air A design value of refractive index was set to 1.444 for the low-refractive-index layer, 2.08 for the high-refractive-index layer and 1.5 for the product substrate (BK7).

Referring to FIG. 7(b), the monitoring point 116a associated with the monitoring monochromatic light beam channel 1 was set at a position 5 mm inwardly distant from the outer perimeter of the product substrate 94 having a diameter of 300 mm. The monitoring points 116b to 116h associated with the channels 2 to 8, respectively, were set at positions at regular intervals of 10 mm from the monitoring point 116a in a direction toward the center of the rotating substrate circle.

Of the eight monochromatic light fluxes emitted from a tunable laser light source, which is equivalent to the light emitter 95 in FIG. 7, the channels 1 and 2 were assigned to the monochromatic light flux having a monitoring wavelength of 1552.52 nm, the channels 3 and 4 were assigned to the monochromatic light flux having a monitoring wavelength of 1553.32 nm, the channels 5 and 6 were assigned to the monochromatic light flux having a monitoring wavelength of 1554.12 nm, and the channels 7 and 8 were assigned to the monochromatic light flux having a monitoring wavelength of 1554.92 nm. For the light fluxes received by the light receiver 98, the reciprocal transmittances were calculated from the transmittances calculated by the DSP 101. Using the calculated reciprocal transmittances, quadratic function regression in the vicinity of a peak of the reciprocal transmittance curve was performed, thereby calculating a predicted time when the peak is achieved. The predicted time was regarded as a terminating time point for film formation.

Figure 18:
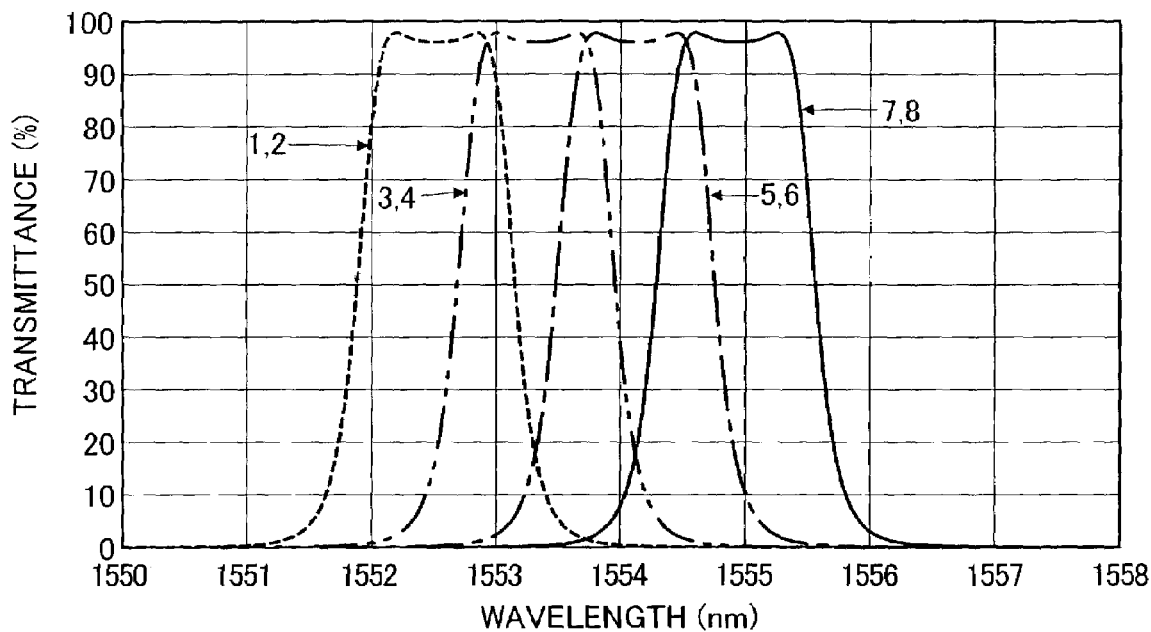
FIG. 18 is a graph showing a spectral transmittance property of a narrow-band pass filter provided in Example 9.

FIG. 18 shows spectral transmittance properties for the monitoring regions on the substrate associated with the channels 1 to 8. It can be seen that a satisfactory optical product serving as a medium band pass filter is provided.

Example 10

Anti-reflection film was prepared by the dielectric multilayer film manufacturing apparatus in FIG. 7, the anti-reflection film comprising alternate layers of $Ta_2O_5$ film, which is a high-refractive-index layer, and $SiO_2$ film, which is a low-refractive-index layer, the optical film thickness of a first and second layers not being an integral multiple of the $\lambda/4$ ($\lambda$: a monitoring wavelength), and the terminating time point for film formation of the final surface layer (second layer) being predicted by peak control. Monitoring wavelengths used were 1550 nm, 1555 nm, 1560 nm and 1565 nm. The optical thin film was arranged as follows.:

Glass product substrate (BK7) with anti-reflection coating|0.35H, 1.288L |air

A design value of refractive index was set to 1.444 for the low-refractive-index layer, 2.08 for the high-refractive-index layer and 1.5 for the product substrate (BK7).

Referring to FIG. 7(b), the monitoring point 116a associated with the monitoring monochromatic light beam channel 1 was set at a position 5 mm inwardly distant from the outer perimeter of the product substrate 94 having a diameter of 300 mm. The monitoring points 116b to 116h associated with the channels 2 to 8, respectively, were set at positions at regular intervals of 10 mm from the monitoring point 116a in a direction toward the center of the rotating substrate circle.

Of the eight monochromatic light fluxes emitted from a tunable laser light source, which is equivalent to the light emitter 95 in FIG. 7, the channels 1 and 2 were assigned to the monochromatic light flux having a monitoring wavelength of 1550 nm, the channels 3 and 4 were assigned to the monochromatic light flux having a monitoring wavelength of 1555 nm, the channels 5 and 6 were assigned to the monochromatic light flux having a monitoring wavelength of 1560 nm, and the channels 7 and 8 were assigned to the monochromatic light flux having a monitoring wavelength of 1565 nm. For the light fluxes received by the light receiver 98, the reciprocal transmittances were calculated from the transmittances calculated by the DSP 101. For the first layer, the reciprocal transmittances were used to predict a terminating time point for film formation for 0.35 H, and for the second layer, quadratic function regression in the vicinity of a peak of the reciprocal transmittance curve was performed to calculate a predicted time when the peak is achieved, and the predicted time was regarded as a terminating time point for film formation.

Figure 19:
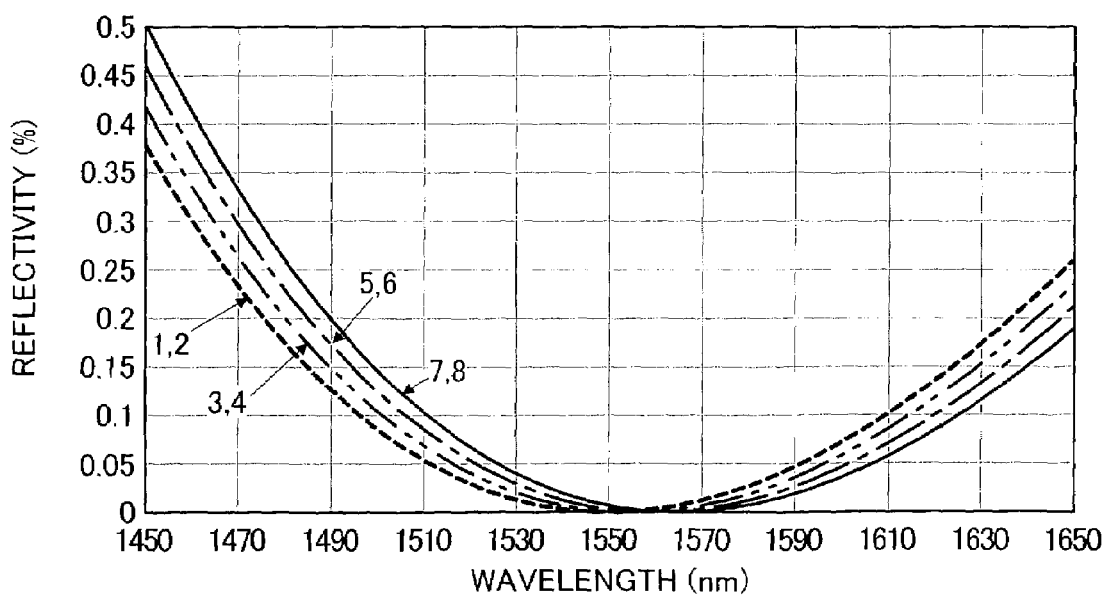
FIG. 19 is a graph showing a spectral reflectivity property of anti-reflection film provided in Example 10.

FIG. 19 shows spectral reflectivity properties for the monitoring regions on the substrate associated with the channels 1 to 8. It can be seen that a satisfactory optical product serving as anti-reflection film is provided.

As is apparent from the above description, according to the optical film thickness controlling method of the invention, the monitor substrate need not be replaced with a new one each time when the latest surface layer film to be formed is changed, and the extra arrangement of a phase difference (like the case in the prior art) to improve the measurement precision becomes unnecessary, because the peak or bottom control is performed. Thus, the process is simplified. In addition, since the reciprocal transmittance is used, the peak or bottom prediction is performed by quadratic regression with a satisfactory correlation, and thus, the film thickness can be controlled with high precision.

In addition, since the in-situ measurement, that is, direct monitoring, of product thin film can be performed, the reproducibility of the monitored film need not be considered.

In the film thickness controlling apparatus according to the invention, a plurality of parallel light beams are used for monitoring the film thickness. Therefore, the distribution of the film thickness of the latest surface layer film can be detected with high precision, and thus, a high uniformity of the film thickness can be assured.

With the dielectric multilayer film manufacturing apparatus according to the invention, quadratic function regression in the vicinity of a peak of the transmittance or reciprocal transmittance is performed, and a film growing time corresponding to a maximum or minimum of the resulting regression function is used as a predicted time when desired film thickness is reached to. Thus, the increasing optical film thickness can be controlled with high precision. In addition, the direct monitoring method involving various monitoring wavelengths can provides an enlarged monitoring region that provides dielectric thin film with a satisfactory property. Therefore, a high-quality optical thin film product which is a device for a dense wavelength division multiplexing system, such as a narrow-band pass filter, can be produced on a large scale.

Furthermore, dielectric multilayer films including a band pass filter manufactured by the above-described optical film thickness controlling apparatus or dielectric multilayer film manufacturing apparatus have a satisfactory optical property and accordingly, a high performance.

| Description of Reference Numerals | |
|---|---|
| 1, 61 and 91: | Vacuum chamber |
| 2: | Electron gun |
| 2a: | Shutter |
| 4, 23, 64 and 94: | Rotatable substrate |
| 12: | Tunable laser light source |
| 13: | Optical coupler |
| 14: | Fiber collimator |
| 15: | Sputtering film formation device |
| 16: | Photodiode |
| 17, 70 and 100: | 8-channel A/D converter (A/D converter) |
| 18: | CPU (Controller) |
| 19: | Motor driver (Controller) |
| 20 and 21: | Optical fiber |
| 28, 62 and 92: | Sputtering target unit (Film formation source) |
| 29 and 81: | Movable shutter |
| 63 and 93: | Ion gun unit (Reaction source) |
| 65 and 95: | Light emitter |
| 66 and 96: | Upper light introducing window |

-continued

| Description of Reference Numerals | |
|---|---|
| 67 and 97: | Lower light introducing, window |
| 68 and 98: | Light receiver (Light intensity measuring means) |
| 69 and 99: | 8-channel preamplifier |
| 71 and 101: | Digital signal processor (DSP) |
| 72 and 102: | Computer |
| 74 and 104: | Ta target |
| 75 and 105: | Si target |
| 76 and 106: | Sputtering gas pipe |
| 77 and 107: | Fixed opening |
| 78 and 108: | Reactive gas pipe |
| 79 and 109: | BCR ion gun |
| 82 to 89: | Monitoring point |
| 111a and 111b: | Variable opening (Film deposition rate controlling member) |
| 112 to 115: | Split shutter (Film thickness correcting member) |
| 116a to 116h: | Monitoring point |

What is claimed is:

1. An optical film thickness controlling method, comprising:

transmitting, over a film formation period of single-layer- or multilayer-structured optical thin film made of one or more kinds of dielectric, incident monochromatic light through said single-layer or multilayer structure to measure a transmittance of said optical thin film and calculate a reciprocal of the transmittance as a reciprocal transmittance, regressing measured data group of two variables by a least squares method to a quadratic function before said measured data group achieves a maximum or minimum, the two variables being a film growing time of the latest surface layer film being deposited in association with increase of the film thickness thereof and said reciprocal transmittance, and using a film growing time at a maximum point or minimum point on said quadratic regression function as a predicted value of said film growing time when optical film thickness at a maximum or minimum on said reciprocal transmittance is achieved, the maximum and minimum of said reciprocal transmittance having a periodical distribution at every interval of optical film thickness coinciding to ¼ of wavelength of said monochromatic light based on an interference theory.

2. The optical film thickness controlling method according to claim 1, wherein a time differential or time difference of the optical film thickness is calculated from said reciprocal transmittance having a periodical distribution in accordance with the growth of said latest surface layer film, at every interval of optical film thickness coinciding to ¼ of wavelength of said monochromatic light is calculated as a deposition rate of said latest surface layer film, and the film growing time of said latest surface layer film when reaching to a target value of said optical film thickness thereof is predicted based on the deposition rate.

3. The optical film thickness controlling method according to claim 1 or 2, wherein as said optical thin film is growing, said transmittance is measured on a product substrate, and the optical film thickness of said latest surface layer film is measured by a direct monitoring method.

* * * * *